United States Patent [19]

Larsen et al.

[11] Patent Number: 5,374,853
[45] Date of Patent: Dec. 20, 1994

[54] TRANSIENT DAMPING THYRISTOR CONTROLLED SERIES CAPACITOR SYSTEM

[75] Inventors: Einar V. Larsen, Charlton; Sandeep Nyati, Schenectady; Murray A. Eitzmann, Ballston Lake, all of N.Y.; Josef Urbanek, Media, Pa.; Kara Clark, Schenectady, N.Y.

[73] Assignee: Electric Power Research, Inc., Palo Alto, Calif.

[21] Appl. No.: 48,133
[22] Filed: Apr. 13, 1993

Related U.S. Application Data

[63] Continuation-in-part of Ser. No. 806,768, Dec. 13, 1991, Pat. No. 5,202,583.

[51] Int. Cl.⁵ .............................................. H02H 9/00
[52] U.S. Cl. .................................. 307/102; 323/211; 361/107
[58] Field of Search ................ 323/210, 211; 307/102, 307/105; 322/58; 361/58, 107

[56] References Cited

U.S. PATENT DOCUMENTS

| | | | |
|---|---|---|---|
| 4,188,573 | 2/1980 | Gyugyi et al. | 323/119 |
| 4,292,545 | 9/1981 | Hingorani | 307/102 |
| 4,302,715 | 11/1981 | Putman et al. | 323/210 |
| 4,311,253 | 1/1982 | Putman et al. | 322/25 |
| 4,355,241 | 10/1982 | Hingorani | 307/102 |
| 4,434,376 | 2/1984 | Hingorani | 307/102 |
| 4,438,386 | 3/1984 | Gyugi | 323/210 |
| 4,451,777 | 5/1984 | Gyugi | 323/210 |
| 4,513,240 | 4/1985 | Putman | 323/210 |
| 4,567,423 | 1/1986 | Dobsa et al. | 322/25 |
| 4,607,217 | 8/1986 | Bhargava | 324/78 |
| 4,724,333 | 2/1988 | Hedin | 307/105 |
| 4,808,843 | 2/1989 | Hedin | 307/105 |
| 4,811,236 | 3/1989 | Brennen et al. | 364/483 |
| 4,843,513 | 6/1989 | Edris | 361/20 |
| 4,999,565 | 3/1991 | Nilsson | 323/210 |
| 5,032,738 | 7/1991 | Vithayathil | 307/112 |
| 5,121,048 | 6/1992 | Larson | 323/210 |
| 5,202,583 | 4/1993 | Larsen et al. | 307/102 |

OTHER PUBLICATIONS

Christl, et al., "Advanced Series Compensation with Variable Impedance," presented at EPRI FACTS Workshop, Cincinnati, Ohio, Nov. 14, 1990.
Vithayathil, et al., "Case Studies of Conventional and Novel Methods of Reactive Power Control on an AC Transmission System," CIGRE paper for SC 38-02, Paris, Sep. 1988.
Christl, et al., "Advanced Series Compensation (ASC) with Thyristor Controlled Impedance," CIGRE paper 14/37/38-05, Paris, Aug. 30-Sep. 5, 1992.
Keri, et al., "Improving Transmission System Performance Using Controlled Series Capacitors," CIGRE paper 14/37/38-07, Paris Aug. 30-Sep. 5, 1992.
Flexible AC Transmission Systems (FACTS): Scoping Study, vol. 2, Part 1: Analytical Studies, EPRI RP3022-2, Sep. 1991.
Larsen, et al., "Benefits of Thyristor-Controlled Series Compensation," CIGRE paper 14/37/38-04, Paris Aug. 30-Sep. 5, 1992.
Urbanek, et al., "Thyristor Controlled Series Compensation Prototype Installation at the Slatt 500 kV Substation," IEEE PES Paper 92-SM-467-1 PWRD, Seattle, Jul. 1992.
Larsen, et al., "Thyristor controlled Series Compensation-Control Design and Dynamic Performance," EPRI FACTS Conference, Boston, May 1992.

*Primary Examiner*—Jeffrey L. Stearrett
*Attorney, Agent, or Firm*—Flehr, Hohbach, Test, Albritton & Herbert

[57] ABSTRACT

A thyristor controlled series capacitor (TCSC) system, including a method and apparatus, uses phase controlled firing based on monitored capacitor voltage and line current. For vernier operation, the TCSC system predicts an upcoming firing angle for switching a thyristor controlled commutating circuit to bypass line current around a series capacitor. Each bypass current pulse changes the capacitor voltage proportionally to the integrated value of the current pulse. To damp the natural oscillatory response of the inductive commutating circuit and the capacitor, a bypass mode firing angle is introduced to create a nonlinear response. The harmonic distortion on the commutating circuit current waveform is determined from the capacitor voltage, which is then used to determine the magnitude of the firing angle. Preferably the firing angle magnitude decreases in response to decreasing capacitor voltage, eventually returning to steady-state conditions.

20 Claims, 17 Drawing Sheets

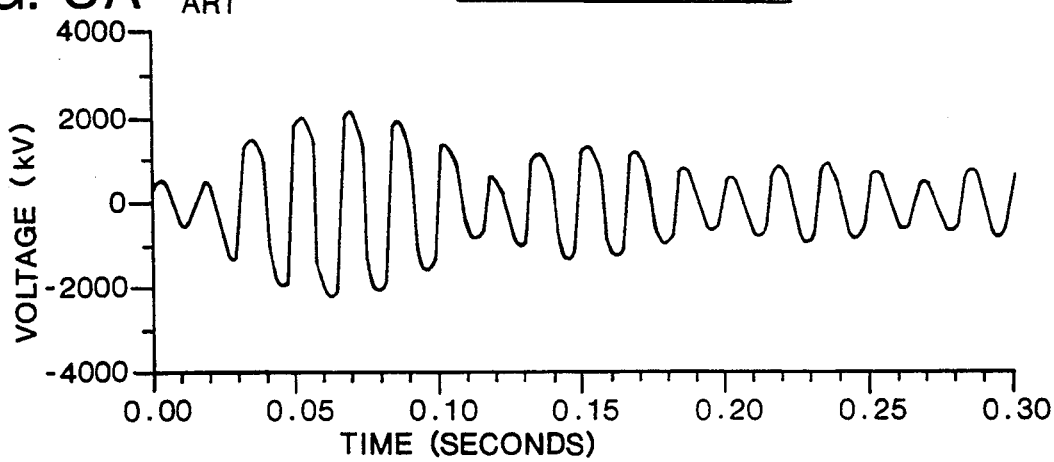
FIG. 8A PRIOR ART — CAPACITOR VOLTAGE
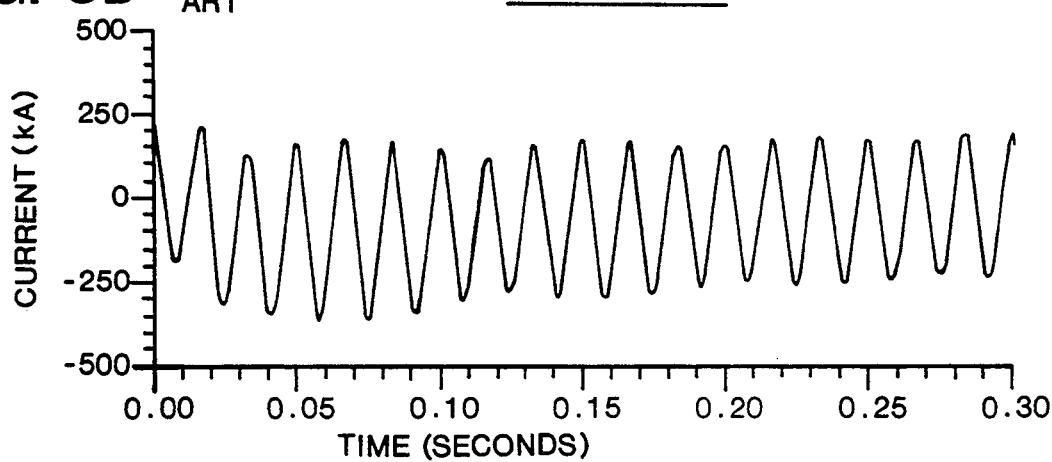
FIG. 8B PRIOR ART — LINE CURRENT
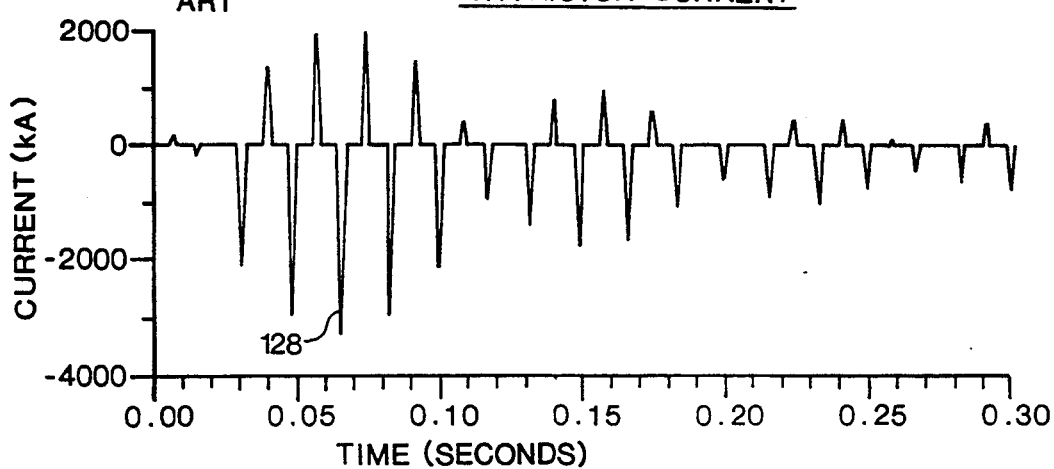
FIG. 8C PRIOR ART — THYRISTOR CURRENT

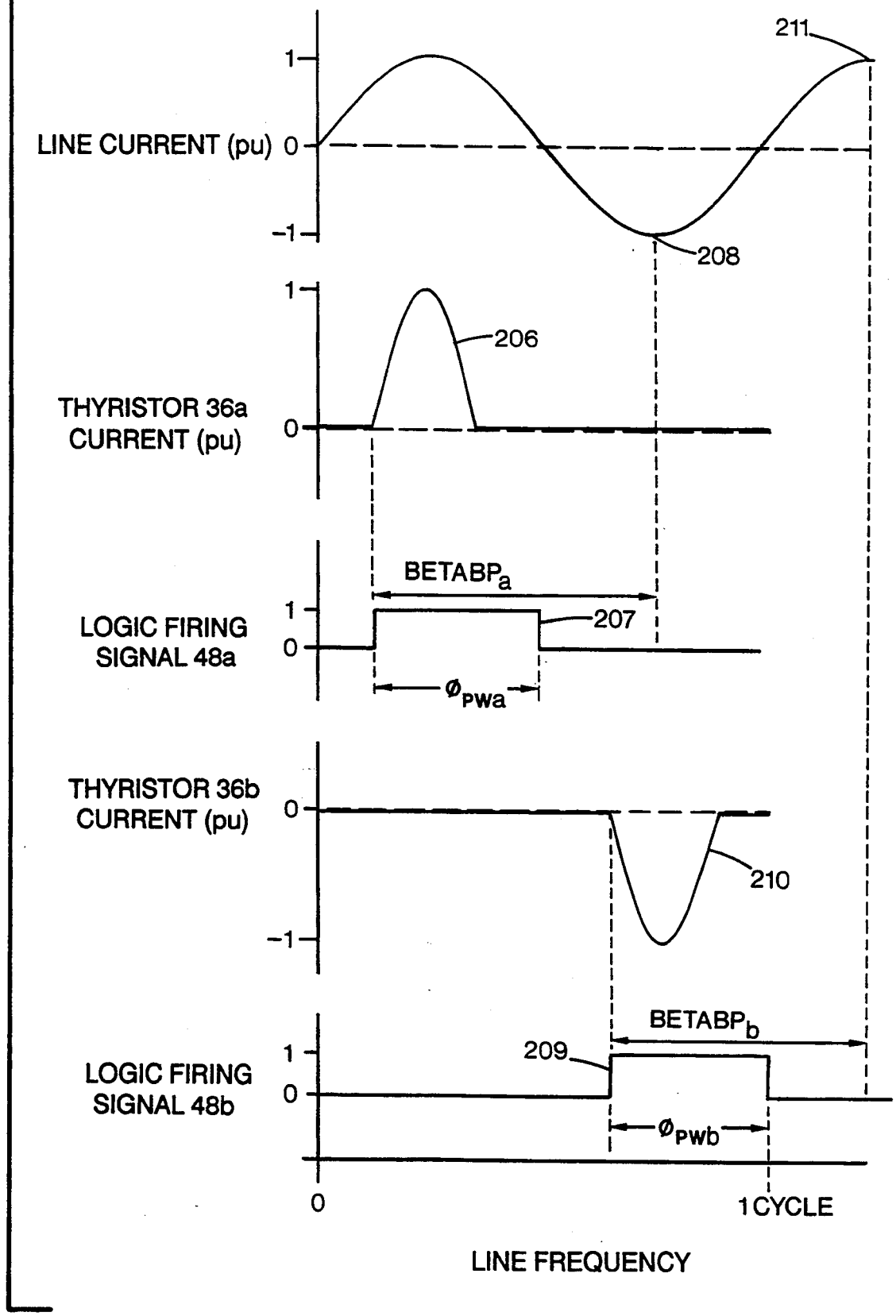

TRANSIENT DAMPING THYRISTOR CONTROLLED SERIES CAPACITOR SYSTEM

This is a continuation-in-part application of the United States application Ser. No. 07/806,768, filed on Dec. 13, 1991, granted U.S. Pat. No. 5,202,583, having an issue date of Apr. 13, 1993, which both have at least one co-inventor in common.

BACKGROUND OF THE INVENTION

The present invention relates generally to a thyristor controlled series capacitor in series with a substantially inductive transmission line, and more particularly to a firing control system, including a method and an apparatus, for secure vernier operation of a thyristor controlled series capacitor system, such as may be used in an alternating current (AC) power distribution system for damping subsynchronous oscillations and direct current (DC) offset.

Other systems have been proposed for damping subsynchronous oscillations and DC offset in power transmission systems. For example, U.S. Pat. No. 4,292,545 to Hingorani discloses a thyristor controlled capacitor in series with a transmission line. Hingorani's system uses a thyristor valve firing at a fixed time after a zero-crossing of the capacitor voltage. In U.S. Pat. No. 4,434,376 to Hingorani, which is a divisional of the Hingorani '545 patent, this concept is extended to have firing at a variable time after a capacitor voltage zero-crossing. In the Hingorani '376 patent, the firing time is adjusted relatively slowly, based upon a measurement of the frequency of the AC power system network voltage or current. In U.S. Pat. No. 4,355,241 also to Hingorani, overload protection is added by also triggering the thyristor valve in response to an over-voltage across a series reactance. This series reactance comprises a plurality of tuned circuits, each of which may be tuned to a separate undesirable subsynchronous frequency of the power system so the normal system frequency is unimpeded.

One serious drawback to the systems proposed by Hingorani in his '545, '376, and '241 patents (hereinafter and collectively referred to as "Hingorani") is that Hingorani requires several firings of the thyristor valves before the series capacitor voltage finally creeps-up to the desired level. Furthermore, after reaching the desired level, the Hingorani system typically overshoots the desired value. Other disadvantages of the Hingorani system are discussed further below.

In a 1988 paper by J. J. Vithayathil, et al. entitled, "Case Studies of Conventional and Novel Methods of Reactive Power Control on an AC Transmission System," it was suggested that by using partial conduction of an inductor across a series capacitor, the effective compensation level of the series capacitor could be varied substantially. Vithayathil also suggested that this system could be beneficial for stabilizing power systems. However, Vithayathil's inductor is controlled in the same way that a thyristor controlled reactor of a static VAR compensator is controlled, which is essentially the same as the Hingorani system. That is, both the Hingorani and Vithayathil systems are based on timing signals derived from the zero-crossing times of the capacitor voltage. The Vithayathil scheme also involves determining a firing time by assuming a purely sinusoidal voltage across the capacitor which, in actuality, is not a pure sinusoidal waveform.

In a 1990 paper by N. Christl, et al. entitled "Advanced Series Compensation With Variable Impedance," a "thyristor controller" mode is described which is similar to the "vernier" mode discussed further below. Christl shows several waveforms resulting from using the firing delay angle as the controlling variable.

One publication, entitled "Thyristor-Switched Capacitors, TSC, in Theory and Practice," by K. Enberg, et al., discusses the use of thyristor switched capacitors (TSC's) applied in shunt to the power grid 22. While Enberg et al. mention that a control strategy can be effective in damping oscillations induced by the insertion of a capacitor, Enberg et al. are totally silent as to any manner of accomplishing this damping.

Each of these earlier systems of Hingorani, Vithayathil, and Christl merely discloses a thyristor controlled series capacitor system where the firing of the thyristor valves is based on a time determined from either the actual or the synthesized time of zero-crossings of the capacitor voltage. These systems are incapable of quickly and precisely damping subsynchronous oscillations and DC offsets in a power transmission system. Moreover, each of these firing systems is slow to respond.

None these earlier systems provides a secure means of controlling a thyristor controlled series capacitor where the actual capacitor voltage responds promptly to a command signal. Furthermore, these earlier systems are incapable of precisely controlling the duty on the thyristors. Additionally, these earlier systems are susceptible to drifting of the capacitor voltage away from a desired setting due to disturbances in the transmission line current.

Thus, a need exists for an improved firing control system for secure vernier operation of a thyristor controlled series capacitor used in power transmission systems to damp subsynchronous oscillations and DC offset, which is directed toward overcoming, and not susceptible to, the above limitations and disadvantages.

SUMMARY OF THE INVENTION

A firing control scheme, including a method and apparatus, for secure vernier operation of a thyristor controlled series capacitor (TCSC) in series with a transmission line uses phase control firing based on monitored capacitor voltage and line current. The TCSC system has a thyristor switched inductive commutating circuit in parallel with the series capacitor. Vernier operation of the TCSC system is provided by predicting an upcoming firing angle for switching the commutating circuit to conduct a thyristor bypass current pulse therethrough. The current pulse causes an alternating offset component of voltage to appear across the series capacitor, in addition to the normal voltage component. Each current pulse changes the capacitor voltage proportionally to the integrated value of the current pulse. The TCSC system promptly responds to an offset command from a higher-level controller, precisely controls the duty on the bypass thyristors to minimize thyristor damage, and prevents drift of the capacitor voltage away from a desired setting during line current disturbances.

In an illustrated embodiment, the vernier controller quickly damps transients induced in the commutating circuit at the beginning of bypass operation, as well as transients induced on the transmission line during insertion of the capacitor.

An overall object of the present invention is to provide an improved method of controlling a thyristor controlled series capacitor system for use in an AC transmission line to damp subsynchronous oscillations and undesirable DC offset occurring therein.

A further object of the present invention is to provide an improved thyristor controlled series capacitor system, and an improved vernier controller for use with such a system.

Another object of the present invention is to provide a secure means of controlling a thyristor controlled series capacitor system which responds promptly to a firing command, minimizes damage to the thyristors, and maintains the capacitor voltage at a predetermined level despite power system disturbances.

An additional object of the present invention is to provide a thyristor control series capacitor system which damps transients caused by the electrical insertion and removal of a series capacitor in a transmission line.

The present invention relates the above features and objects individually as well as collectively. These and other objects, features and advantages of the present invention will become apparent to those skilled in the art from the following description and drawings.

BRIEF DESCRIPTION OF THE DRAWINGS

FIGS. 6A–9E show the responses of several systems and control variables when subjected to a small system disturbance.

FIGS. 6A, 6B and 6C are graphs for vernier operation of the TCSC system of FIG. 1, with FIGS. 6A–6C showing waveforms of the capacitor voltage, the line current, and the thyristor current, respectively.

FIGS. 8A, 8B and 8C are graphs for the Hingorani system, with FIGS. 8A–8C showing waveforms of the capacitor voltage, the line current, and the thyristor current, respectively.

FIGS. 9A, 9B, 9C, 9D and 9E are graphs for several of the internally controlled variables for the vernier controller of FIGS. 1 and 2, with FIGS. 9A–9D showing waveforms of the variables ALOP, ALMAG, ASPM, and VOIM, respectively, and FIG. 9E showing a waveform of BETAF, which corresponds to BETAP when BETAC is zero.

FIG. 10B showing the thyristor current and the line current.

FIG. 11 is a combination graph of one manner of operating the TCSC system of FIGS. 1 and 2, illustrating the firing of the thyristors with respect to the line current for bypass mode operation.

FIG. 12B showing the thyristor current, shown in solid lines, and the line current, shown in dashed lines; FIG. 12C showing the firing command logic for the positive thyristor in FIG. 1; and FIG. 12D showing the firing command logic for the negative thyristor in FIG. 1.

FIGS. 13A and 13B show entry into the bypass mode for a commutating circuit having a resonant frequency at the third harmonic;

FIGS. 14A and 14B show entry into the bypass mode for a commutating circuit having a resonant frequency at the third harmonic, using a change in firing angle from a steady-state bypass value, where this change in firing angle decreases in magnitude as the distortion decreases;

FIGS. 15A and 15B show a capacitor voltage offset following a transition from the bypass mode to the inserted mode, without employing corrective the valve firing;

FIGS. 16A and 16B show a transition from the bypass mode to the inserted mode, employing the bypass valve firing angle generator of FIG. 2; and FIGS. 17A and 17B show another transition from the bypass mode to the inserted mode, employing the valve firing angle generator of FIG. 2.

DETAILED DESCRIPTION OF A PREFERRED EMBODIMENT

Figure 1:
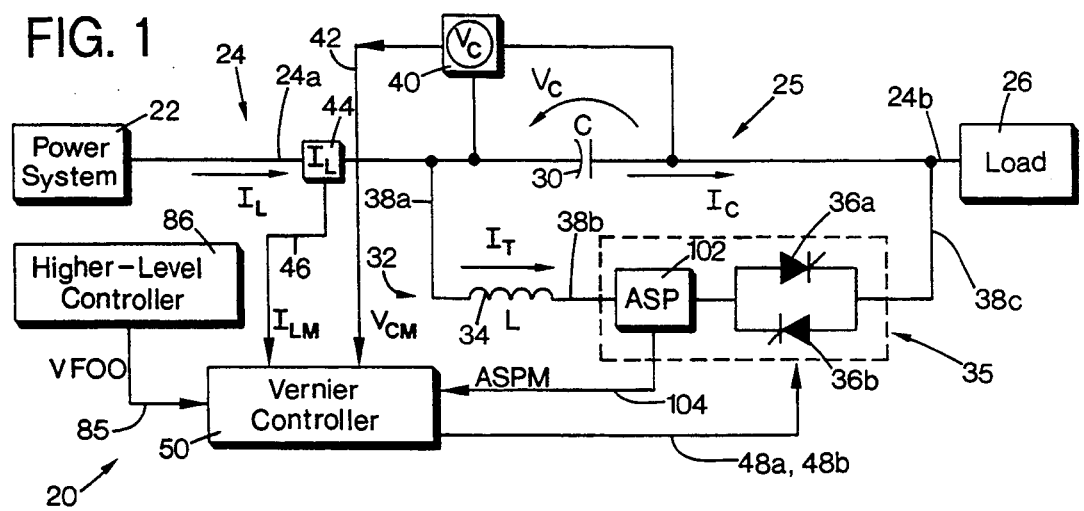
FIG. 1 is a single line schematic diagram of one form of a thyristor controlled series capacitor (TCSC) system of the present invention, shown in series with a transmission line.

FIG. 1 illustrates an embodiment of a thyristor controlled series capacitor (TCSC) system 20 constructed in accordance with the present invention for damping undesirable subsynchronous oscillations and undesirable DC offset occurring in a power system or grid 22. The power system 22 has a transmission line 24 with segments 24a and 24b coupling a single module 25 of the TCSC system 20 in series with the power system 22 and with a load 26, respectively. A line current $I_L$ represents the direction of power flow from the power system 22 to the load 26.

The TCSC module 25 has a capacitor ("C") 30 in series with transmission line 24 and an inductive commutating circuit 32 in parallel with the capacitor 30. The capacitor 30 may be a plurality of discrete capacitors joined as a capacitor bank having a known capacitive reactance $X_C$. The commutating circuit 32 includes an inductive component, such as an inductor ("L") 34, and a thyristor switch or valve 35 in series with the inductor 34. The thyristor valve 35 has two antiparallel diodes 36a and 36b, hereinafter referred to collectively as thyristors 36 unless otherwise noted. The inductor 34 advantageously protects the thyristors 36. The commutating circuit 32 has conductor segments 38a, 38b and 38c coupling the inductor 34 and thyristor valve 35 with the capacitor 30 and transmission line 24 as shown. In FIG. 1 the following variables are shown: $I_L$ for the line current through transmission line 24, $V_C$ for the actual voltage across capacitor 30, $I_C$ for the current through capacitor 30, and $I_T$ for the bypass thyristor current pulse flowing through the inductor 34 and the thyristor valve 35.

The TCSC system 20 has a voltage monitor or sensor, such as a voltmeter 40, monitoring the voltage across the series capacitor 30. The voltage sensor 40 produces a measured capacitor voltage $V_{CM}$ signal 42 in response to the monitored actual capacitor voltage $V_C$. A line current monitor or sensor, such as an ammeter 44, monitors the line current $I_L$ flowing through the transmission line segment 24a. The line current sensor 44 produces a measured line current $I_{LM}$ signal 46 in response to the monitored line current $I_L$. The capacitor voltage $V_{CM}$ and line current $I_{LM}$ are preferably measured each half cycle.

Figure 2:
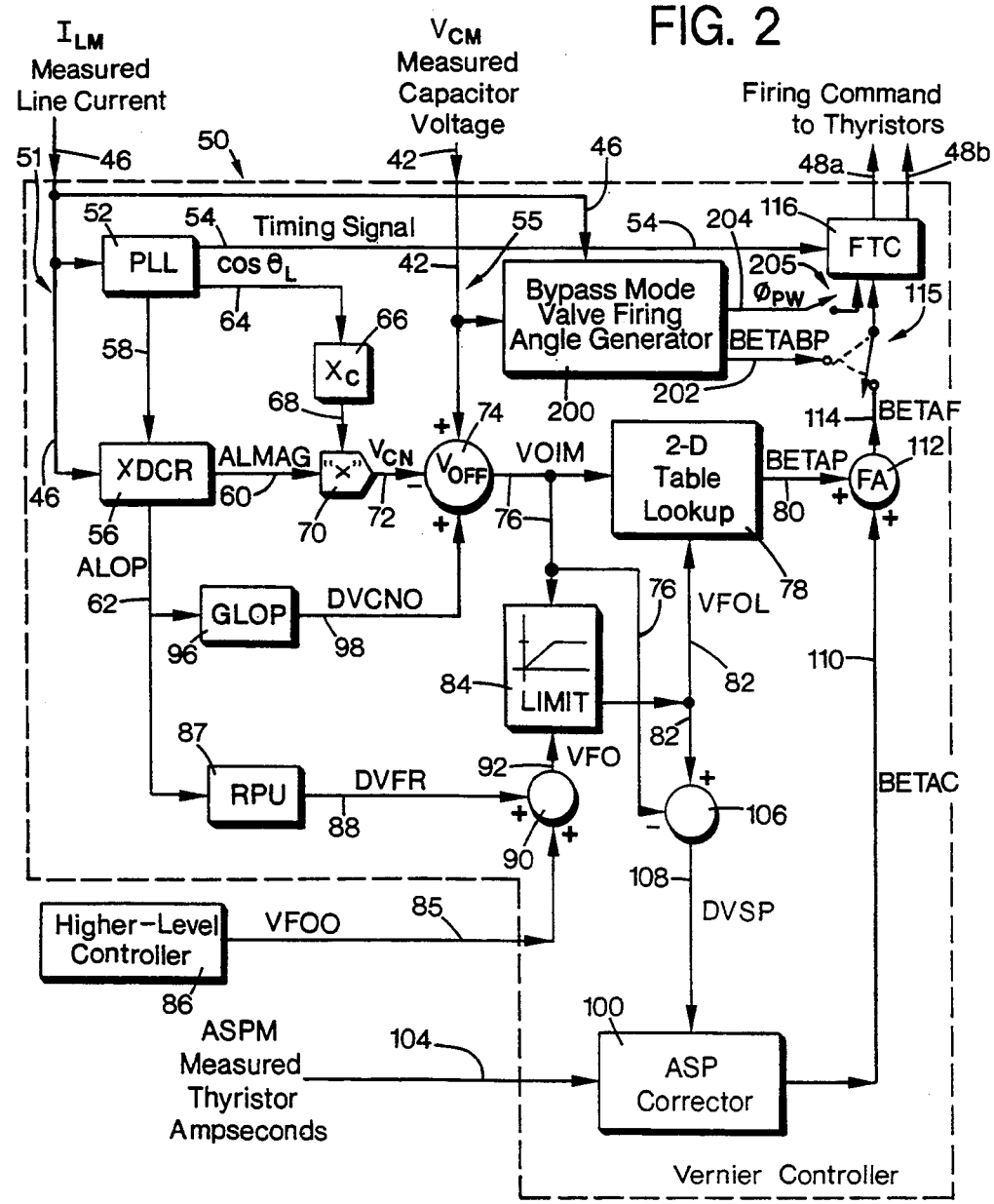
FIG. 2 is a block diagram of one form of a vernier controller of the present invention for controlling the TCSC system of FIG. 1.

The commutating circuit 32 conducts a thyristor current pulse therethrough when the bypass thyristor switch 35 fires to enter a conducting state in response to a firing command or firing pulse signal 48. While the firing command signal 48 is discussed generally herein, it is apparent that signal 48 actually has two components, signal 48a for driving the positive thyristor 36a, and signal 48b for driving the negative thyristor 36b. This firing, preferably ahead of a capacitor voltage zero-crossing, produces an alternating offset voltage component across the series capacitor 30. As shown in FIG. 2, the TCSC system 20 includes control means, such as a vernier controller 50. The controller 50 has firing prediction means, such as a firing predictor 51, for receiving the measured line current $I_{LM}$ signal 46, the measured capacitor voltage $V_{CM}$ signal 42, and other signals as described further below, and for predicting therefrom an upcoming firing time at which the firing pulse signal 48 is provided by the controller 50 to the thyristor switch 35. From the description herein, it is apparent that the vernier controller 50 may be implemented primarily in hardware, primarily in software, or various equivalent combinations of hardware and software known by those skilled in the art.

Figure 3A:
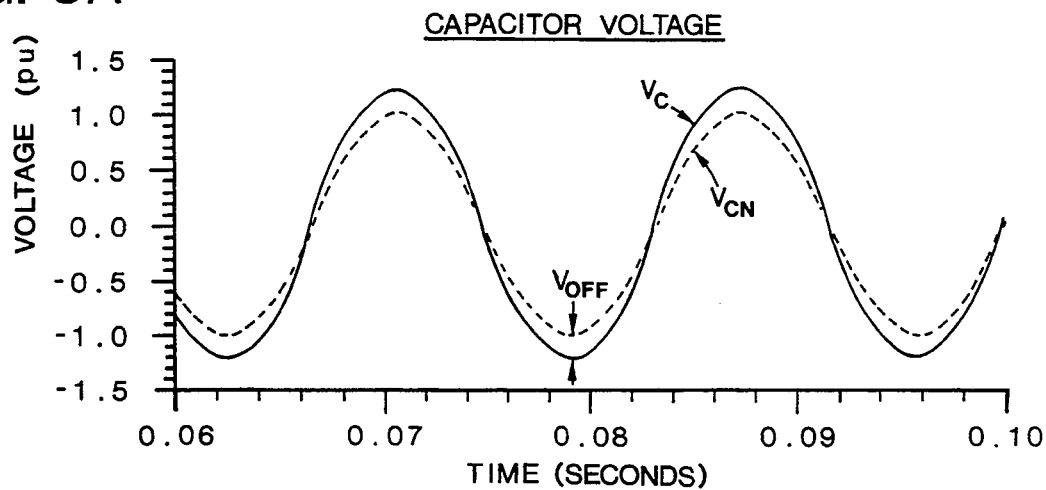
FIGS. 3A, 3B and 3C are graphs of vernier operation of the TCSC system of FIG. 1, with FIG. 3A illustrating the normal and actual capacitor voltages, FIG. 3B showing the line and thyristor currents, and FIG. 3C illustrating the alternating offset voltage component.
Figure 3B:
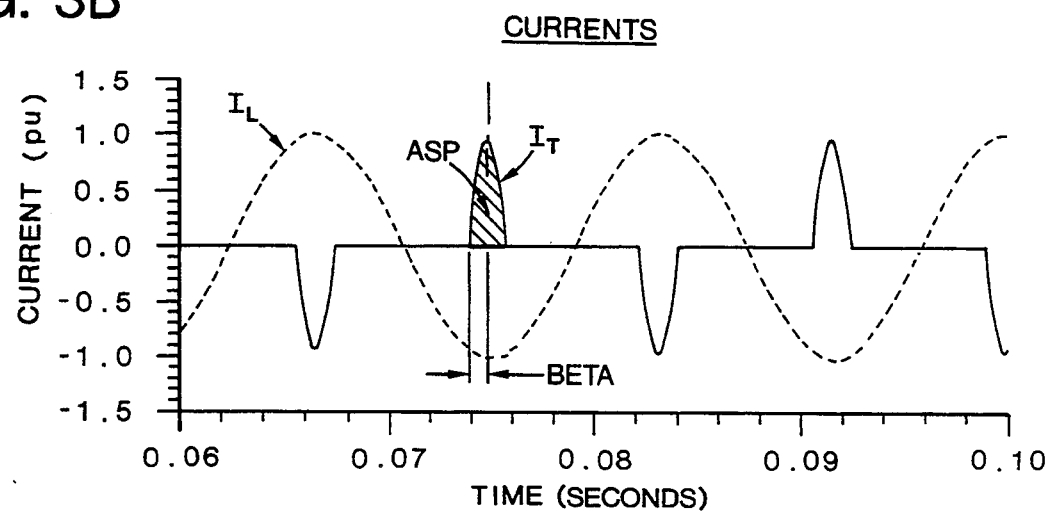
Figure 3C:
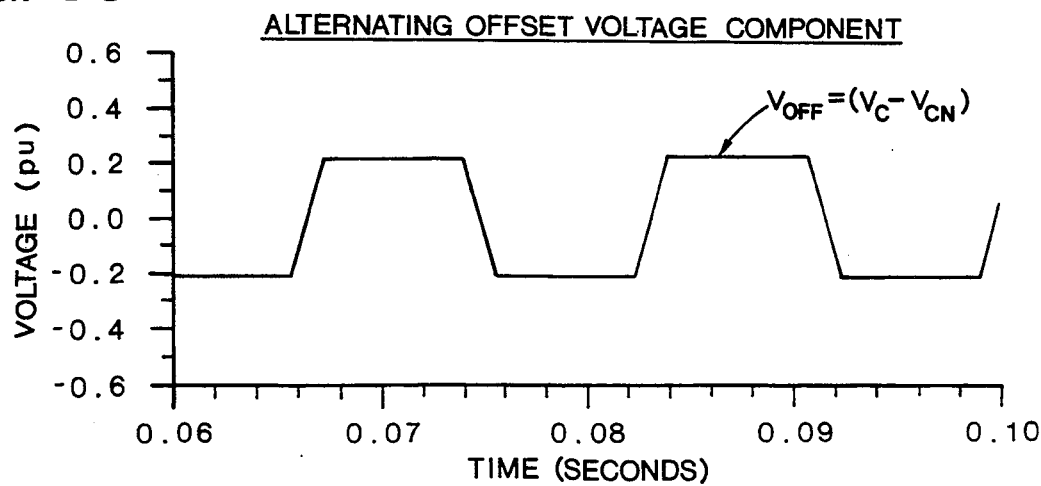

Before describing the operation of the vernier controller 50 in detail, a brief overview of the operation of the TCSC system 20 will be given with reference to the wave shapes of FIGS. 3A-3C. These graphs illustrate the per unit (pu) values of the variables for steady-state operation with 20% vernier control of the capacitor voltage, which is provided in a manner described further below. In FIG. 3A, the actual capacitor voltage $V_C$ includes a normal capacitor voltage component $V_{CN}$ which represents the capacitor voltage that would exist without thyristor firing and with a purely sinusoidal line current $I_L$. The difference between the capacitor voltage $V_C$ and the normal capacitor voltage component $V_{CN}$ is provided by an offset voltage component $V_{OFF}$ shown in FIG. 3C. Each pulse of thyristor current $I_T$ causes a change in the actual capacitor voltage $V_C$ that is proportional to an integrated value of the current $I_T$ in units of ampseconds (ASP), corresponding to the area labeled "ASP" under the $I_T$ current pulses, as shown in FIG. 3B. A predicted "BETA" firing advance signal is illustrated in FIG. 3B, at the beginning of the "ASP" pulse, as being advanced with respect to the negative crest of the $I_L$ line current, shown in dashed lines. The following discussion of the operation of the vernier controller 50 also discloses a method of controlling the TCSC system 20, and a method of inducing a predetermined voltage offset into the capacitor 30.

Referring again to FIG. 2, the controller 50 is illustrated as a primarily microprocessor based software implementation. The controller 50 has synchronizing means which may comprise a synchronizer or phase locked loop means, such as a phase-locked loop device (PLL) 52. The PLL 52 uses the monitored line current $I_{LM}$ signal 46 to create a first timing reference signal 54 which is in synchronism with the line current $I_L$. The PLL 52 may be implemented in a variety of structurally equivalent hardware and software forms known by those skilled in the art.

The firing predictor 51 includes TCSC parameter prediction means, such as a TCSC parameter predictor, for predicting the value of an upcoming variable or parameter of interest for the power flowing through the TCSC system 20. In the illustrated embodiment, the TCSC parameter prediction means comprises capacitor voltage predicting means, such as a capacitor voltage ($V_C$) predictor 55, for predicting the value of an upcoming initial capacitor offset voltage (VOIM) from the measured line current $I_{LM}$ and the measured capacitor voltage $V_{CM}$. The $V_C$ predictor 55 includes transduction means, such as a transduction device devised or programmed to perform a transduction method or routine (XDCR) 56. The XDCR 56 receives the $I_{LM}$ signal 46 and a second timing signal 58 generated by the PLL 52. In the illustrated embodiment, the second timing signal 58 is the same as signal 54, although in some applications it may be advantageous to have different values for timing signals 54 and 58. From the timing signal 58 and the $I_{LM}$ signal 46, the XDCR 56 determines the magnitude of the transduced line current (ALMAG) and provides a corresponding transduced line current magnitude signal 60. The XDCR 56 also determines an offset component of the line current (ALOP), and provides a corresponding measured line current offset component signal 62. The XDCR 56 may be implemented in a variety of structurally equivalent hardware and software forms known by those skilled in the art.

A further portion of the $V_C$ predictor 55 is provided by a portion of the PLL 52 which determines a sinusoidal cos $\phi_L$ function and provides a corresponding cos $\phi_L$ signal 64 in response thereto. The cos $\phi_L$ function represents an instantaneous point on the line current $I_L$ waveform corresponding to the timing signal 54. The angle $\phi_L$ represents the angle of the AC line current $I_L$ being predicted or estimated when the timing signal 54 is emitted from the PLL 52. The known value of the capacitive reactance $X_C$ of capacitor 30 is multiplied by the cos $\phi_L$ function signal 64 by factoring means, such as a capacitive reactance factoring routine or device, illustrated as an $X_C$ gain block 66, to provide a factored cos $\phi_L$ function ($X_C \cos \phi_L$) signal 68.

The $V_C$ predictor 55 also has multiplication means, such as a multiplication routine, shown as a multiplication function block 70. The multiplication function block 70 receives and multiplies together the ALMAG signal 60 and the ($X_C \cos \phi_L$) signal 68 to provide a predicted value of the normal capacitor voltage $V_{CN}$. The predicted normal capacitor voltage $V_{CN}$ is the capacitor voltage which is expected without any firing of the thyristor valve 35 (see FIG. 3A). For example, during steady state conditions, with the ALMAG signal 60 and the capacitive reactance $X_C$ each at a constant value, $V_{CN}$ is a sinusoidal waveform. The multiplier block 70 provides a $V_{CN}$ signal 72 corresponding to this predicted $V_{CN}$ value. The portion of the $V_C$ predictor 55 thus far described, may be referred to collectively as normal capacitor voltage determining device for determining $V_{CN}$ from the monitored line current $I_{LM}$.

The $V_C$ predictor 55 also has comparing means, such as a voltage offset $V_{OFF}$ comparator 74. The $V_{OFF}$ comparator 74 determines an offset voltage component $V_{OFF}$ of the capacitor voltage $V_C$ from the difference between the measured capacitor voltage $V_{CM}$ signal 42 and the predicted normal capacitor voltage $V_{CN}$ signal 72 (see FIGS. 3A and 3C). The comparator 74 expresses this difference by producing a measured initial offset (VOIM) signal 76, which is also the output of $V_C$ predictor 55.

Thus, the $V_C$ predictor 55 predicts the initial capacitor offset voltage VOIM from the monitored line current $I_{LM}$ received from the current sensor 44, and from the monitored capacitor voltage $V_{CM}$ received from the voltage sensor 40. The illustrated $V_C$ predictor 55 includes the portion of the PLL 52 which provides the $\cos \phi_L$ signal 64 and the timing signal 58, the $X_C$ gain block 66, multiplier block 70, the XDCR 56, and the $V_{Off}$ comparator 74.

By knowing this offset voltage component $V_{OFF}$ before firing the thyristor valve 35, the required firing angle may be directly determined so the desired capacitor voltage offset $V_{OFF}$ is obtained at the end of the resulting pulse of thyristor current $I_T$ flowing through the thyristor valve 35. The firing angle to provide the desired voltage offset is easily obtained knowing the physical parameters of the TCSC system circuit, which are primarily the capacitance of the capacitor 30, and the inductance L of inductor 34. To accomplish this, the firing predictor 51 has data storage or memory look-up means, such as a 2-D table look-up table circuit or a programmable data storage device 78. The relationship between these parameters may be precalculated and preprogrammed into a look-up circuit or program 78. The look-up circuit or program 78 may be a programmed array, registers, latches or other structurally equivalent data storage and retrieval programs and devices known by those skilled in the art. The look-up circuit or program 78 determines a predicted firing angle and provides a predicted firing angle (BETAP) signal 80 from the VOIM signal 76 and a desired final offset (VFOL) signal 82 corresponding to a desired final capacitor voltage offset value VFOL.

This portion of the vernier controller 50 represents a predictive aspect of the controller which advantageously enhances the performance of this system over the earlier systems, including those of Hingorani. This phase controlled thyristor firing scheme, where the thyristor valve 35 is fired at a predicted upcoming time after a normal zero-crossing firing time, advantageously provides vernier control of the TCSC system 20. Vernier operation refers adjusting and controlling the capacitor voltage $V_C$ in a continuous manner over the entire voltage waveform.

The firing predictor 51 has limiting means, such as a limiter 84, for limiting VFOL signal 82 to limit the maximum duty of the thyristors 36. The limited VFOL signal 82 is based on the difference between the VOIM signal 76 and a final offset ordered (VFOO) or command signal 85. The VFOO command signal 85 corresponds to an ordered offset for the capacitor voltage $V_C$ which may be generated by a higher-level controller 86. The higher-level controller 86 may be provided, for example, by a system dispatcher of the power system 22 to obtain a desired voltage drop across the TCSC system 20. Another example of the higher-level controller 86 is a load control device (not shown) for industrial applications to control the manner in which load 26 appears to the power system 22.

Optionally, the VFOO command signal 85 may be modified to enhance the performance of the TCSC system 20 by providing a resistive component behavior for the TCSC system 20 as seen by the transmission line 24 and power system 22. To accomplish this enhancement, the illustrated controller 50 has resistive modeling modulator means, such as a resistive effect (RPU) modulator 87, for modulating the VFOO command signal 85 upon receipt from the higher-level controller 86. In essence, the resistive effect modulator 87 modulates the VFOO command signal 85 in a manner which causes the overall reaction of the TCSC system 20 to resemble a resistor in the transmission line 24.

The RPU modulator 87 receives the ALOP signal 62 and multiplies signal 62 by an RPU gain value which represents the magnitude of the desired resistive effect. In this manner, the resistive effect modulator 87 provides a modulating voltage (DVFR) signal 88. The VFOO command signal 85 and the DVFR signal 88 are added together by summing means, such as a summer circuit or routine 90, to produce a final offset voltage (VFO) signal 92. It is apparent that without the optional DVFR signal 88, the final offset voltage VFO signal 92 would correspond to the ordered final offset voltage VFOO signal 85.

The illustrated limiter 84 limits the VFOL signal 82 to a maximum limit based on the difference between the initial VOIM signal 76 and the final VFO signal 92. This limiting function advantageously provides a desired direct control of the duty imposed on the thyristors 36a and 36b. The thyristor duty is limited because the amp-seconds ASP value of a pulse of the thyristor current $I_T$ is directly related to the change in the capacitor voltage $V_C$ over the duration of the pulse (see FIG. 3B). It is apparent that other types of limiting functions may be implemented in particular applications to limit the thyristor duty.

Optionally, the vernier controller 50 may have intra-cycle voltage prediction enhancing means, such as a voltage prediction enhancer (GLOP) 96, for enhancing the prediction of the initial capacitor offset voltage VOIM to predict the value of VOIM at a predetermined intra-cycle time during the thyristor current pulse. The GLOP 96 receives the ALOP signal 62 and multiplies it by a GLOP gain value. The GLOP 96 output is a desired or predicted capacitor voltage (DVCNO) signal 98 which predicts an inter-cycle value for $V_{OFF}$, such as when the thyristor current $I_T$ pulse is a certain way through a cycle, for instance, half way through the cycle. The DVCNO signal 98 is added to the $V_{CN}$ signal 72 and the $V_{CM}$ signal 42 by the $V_{OFF}$ comparator 74. This is possible since the offset component of the current ALOP translates to a change in the offset component of capacitor voltage $V_{OFF}$ over time.

The functions of the vernier controller 50 described above encompass a predictive control for the TCSC system 20 which provides the desired system security. This desired security refers to the prompt response of the actual capacitor voltage $V_C$ to the VFOO command signal 85. This security also refers to the ability of the TCSC system to precisely control the duty on the thyristors 36 to minimize damage to the thyristors. This thyristor duty control is provided by the limiter 84 in the illustrated embodiment. Operational security of the TCSC system 20 is also provided because the voltage $V_C$ across the series capacitor 30 does not drift away from a desired setting due to disturbances in the line current $I_L$ flowing through the TCSC system.

To enhance the long term accuracy for the TCSC system 20, the controller 50 has optional correcting means, such as a thyristor ampseconds (ASP) corrector 100, for correcting the predicted firing angle BETAP 80. The ASP corrector 100 provides a feedback path for the actual ampseconds experienced by the thyristors 36a and 36b. This ampsecond value is measured by thyristor monitoring or sensor means, such as a thyristor ampsecond or ASP monitor 102, for monitoring an ampsecond value of the thyristor current $I_T$ pulse flowing through the commutating circuit 32. The ASP monitor 102 may comprise an ammeter for measuring and integrating the thyristor current $I_T$ to determine a value of the ampseconds and provide a corresponding measured thyristor ampsecond (ASPM) signal 104.

The controller 50 has comparing means, such as a comparator 106, for determining a predicted voltage change (DVSP) signal 108 by subtracting the initial VOIM signal 76 from the final VFOL signal 82. The DVSP signal 108 is supplied to the ASP corrector 100. The ASP corrector 100 compares the ASPM signal 104 with the DVSP signal 108 to establish an error signal within the ASP corrector. The ASP corrector integrates this error signal to provide an output of a corrector firing angle (BETAC) signal 110. The controller 50 has summing means, such as a firing angle summer circuit or routine 112, which adds the corrector BETAC signal 110 to the predicted firing angle BETAP signal 80 to obtain a final firing angle command (BETAF) signal 114.

The controller 50 has a switch 115 for selectively coupling the BETAF signal 114 to firing timing means, such as a firing time computer (FTC) 116, for generating the firing command 48 at the upcoming time predicted by the firing predictor 51. The FTC 116 translates the final BETAF signal 114 into the firing pulse signal 48 at the appropriate times in response to the timing signal 54 received from the PLL 52. Upon receiving the firing command 48, the thyristor valve 35 fires to enter a conducting state from a nonconducting state so pulses of thyristor current $I_T$ can flow through the commutating circuit 32.

Performance

Figure 4A:
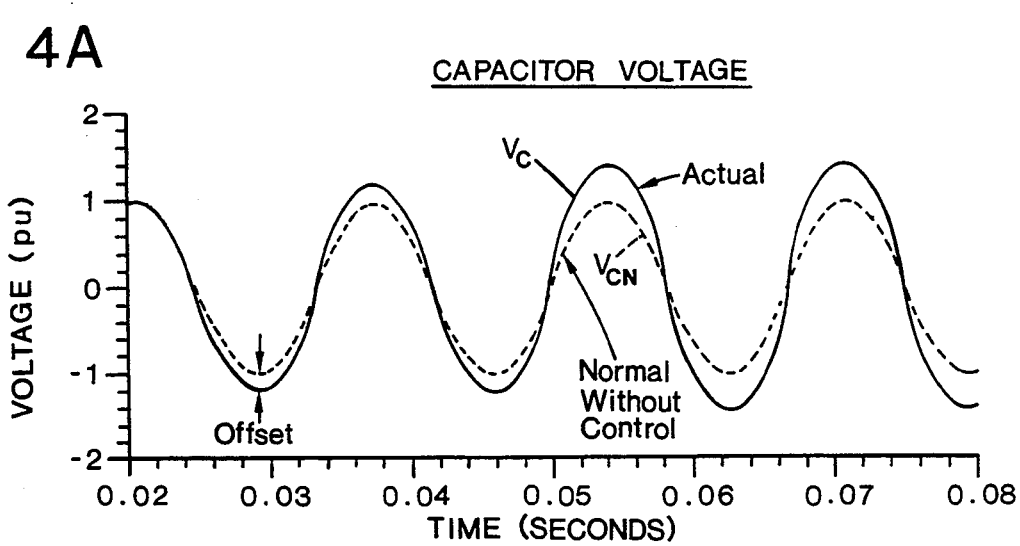
FIGS. 4A, 4B and 4C are graphs of vernier operation of the TCSC system of FIG. 1 acting in response to a step in the commanded capacitor voltage, with FIG. 4A showing the normal and actual capacitor voltage, FIG. 4B showing the thyristor valve current, and FIG. 4C showing the offset order and response.
Figure 4B:
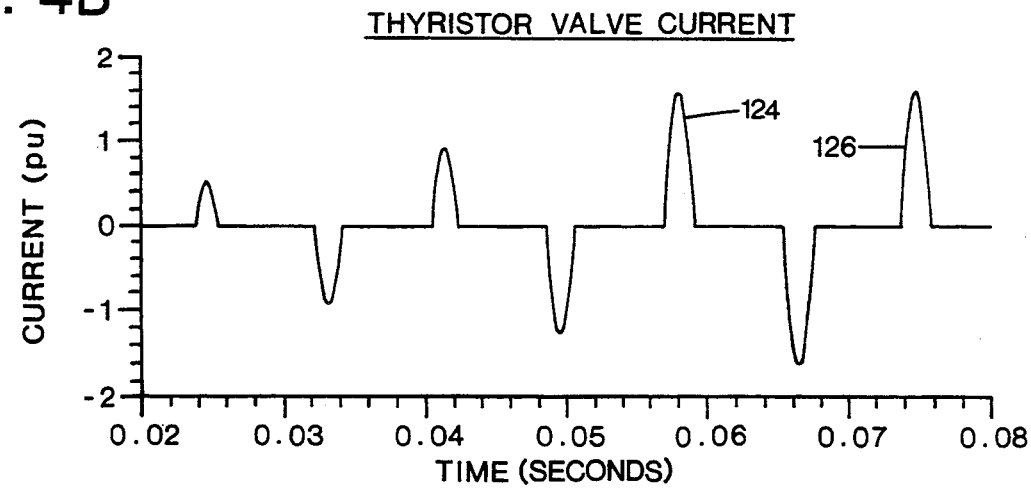
Figure 4C:
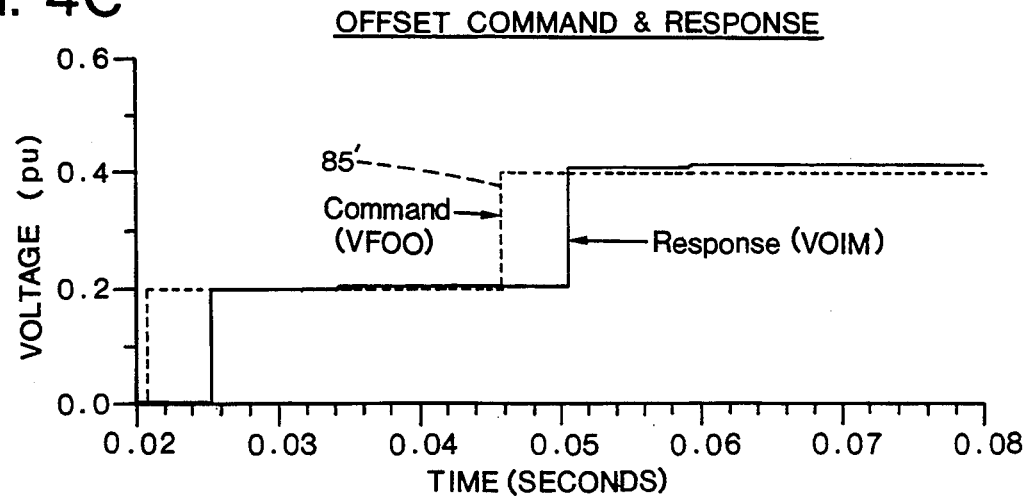
Figure 5A:
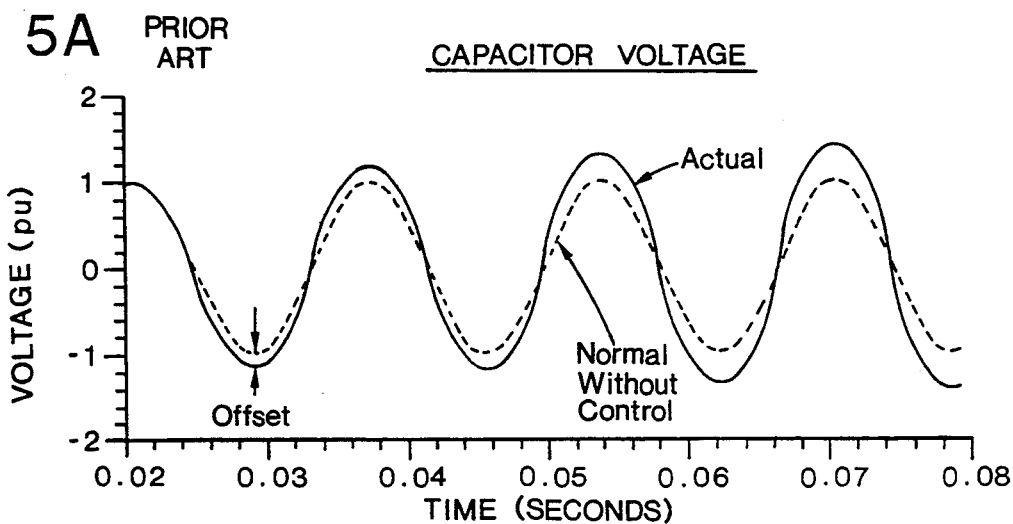
FIGS. 5A, 5B and 5C are graphs of the responses of the prior art Hingorani system acting in response to the same type of step in ordered or commanded capacitor voltage as that of the graphs for FIGS. 4A, 4B and 4C, respectively.
Figure 5B:
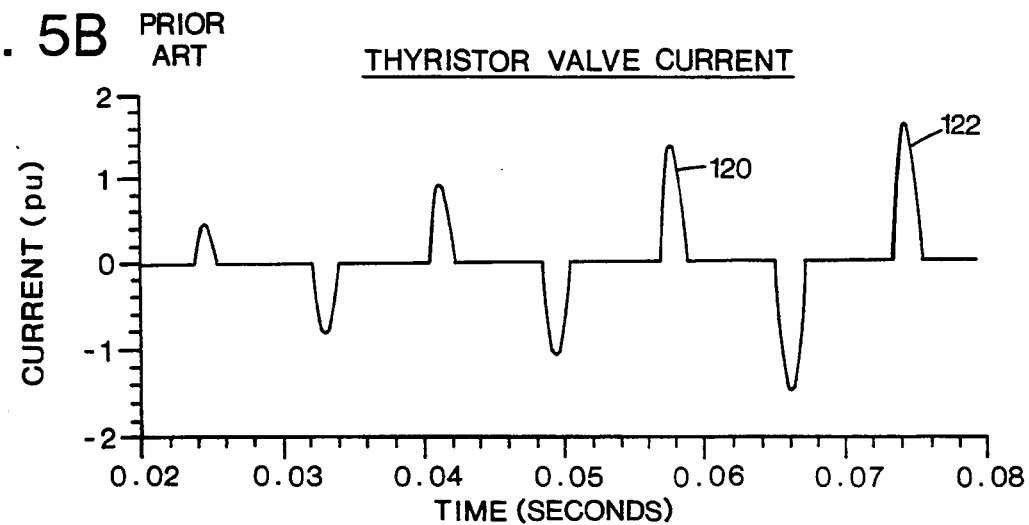
Figure 5C:
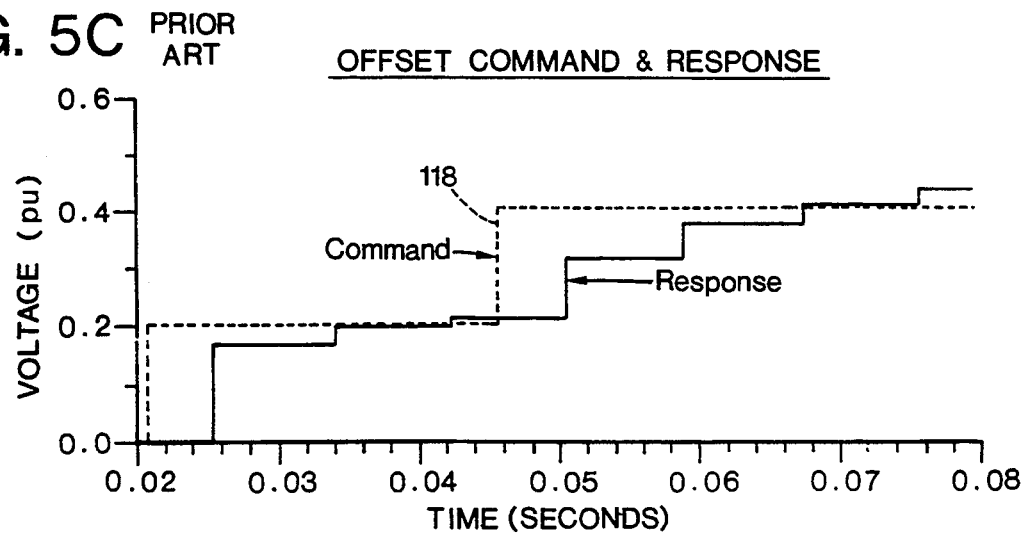

The performance of the TCSC system 20, as shown in FIGS. 4A-4C, is clearly a vast improvement over the operation of the earlier Hingorani system, shown in FIGS. 5A-5C. The wave shapes of FIGS. 4A-4C and 5A-5C show the responses of the system described herein and the Hingorani system, respectively, when subjected to a 0.2 pu (per unit) step change in the ordered capacitor offset voltage.

FIGS. 5A-5C show the Hingorani system slowly creeping upward to the desired level after several valve firings, and then overshooting this desired value. For example, a command 118 to increase the offset voltage is given shortly before 0.046 seconds (see FIG. 5C). As best shown in FIGS. 5B, with a desired thyristor current pulse amplitude of 1.6 pu, a first positive pulse 120 occurring after the command 118 undershoots the desired value, and thereafter, a second positive pulse 122 overshoots this value.

In contrast, the TCSC system 20 provides a prompt response to the VFOO command signal 85', shown in FIG. 4C. For example, the thyristor current pulse amplitude moves promptly to the desired level of 1.6 pu, as shown in FIG. 4B by both positive pulses 124 and 126. Thus, the TCSC system 20 achieves the desired capacitor voltage $V_C$ immediately after the very next valve firing occurring after in the TCSC system 20.

The example of FIGS. 4A-4C illustrates the attainment of the first security objective, namely a fast and accurate response to the VFOO command signal 85 received from the higher-level controller 86. Moreover, these waveforms show that the second security objective of controlling thyristor duty is also satisfied. The thyristor duty is directly related to the change in capacitor voltage on each firing. Thus, precise control of the capacitor voltage also provides precise control of the thyristor duty as well.

The third security objective achieved by the TCSC system 20 relates to the response of the DC offsets in the line current $I_L$. In the absence of any thyristor control, the average capacitor voltage drifts away from the desired zero point if the line current $I_L$ is offset, for example by a system disturbance. This drifting disadvantageously leads to subsynchronous resonance conditions when considering the entire power system circuit comprising an inductive transmission line coupled with a series capacitor. The inductance of the transmission line interacts with the series capacitance to create a series resonant circuit, having a natural frequency which is typically substantially less than the synchronous operating frequency of the AC power system (i.e., 60 Hz for North America). Thus, this natural resonant frequency is referred to as a "subsynchronous frequency."

Figure 6A:
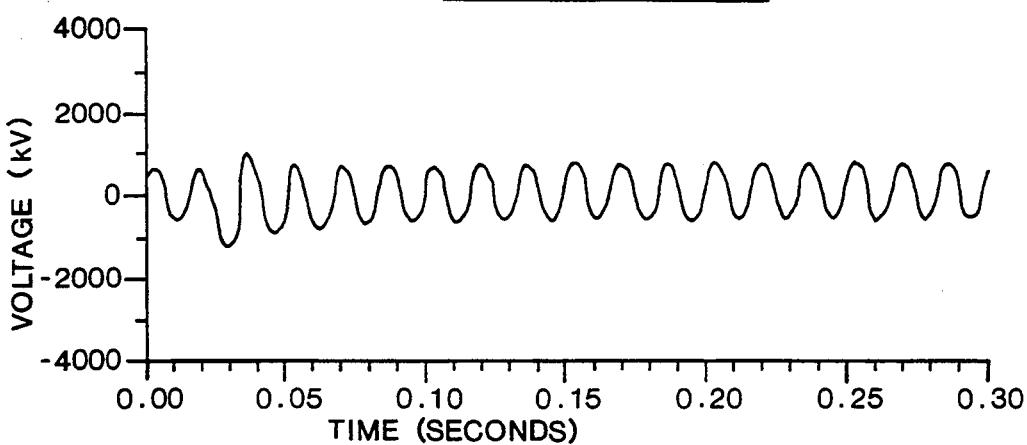
Figure 6B:
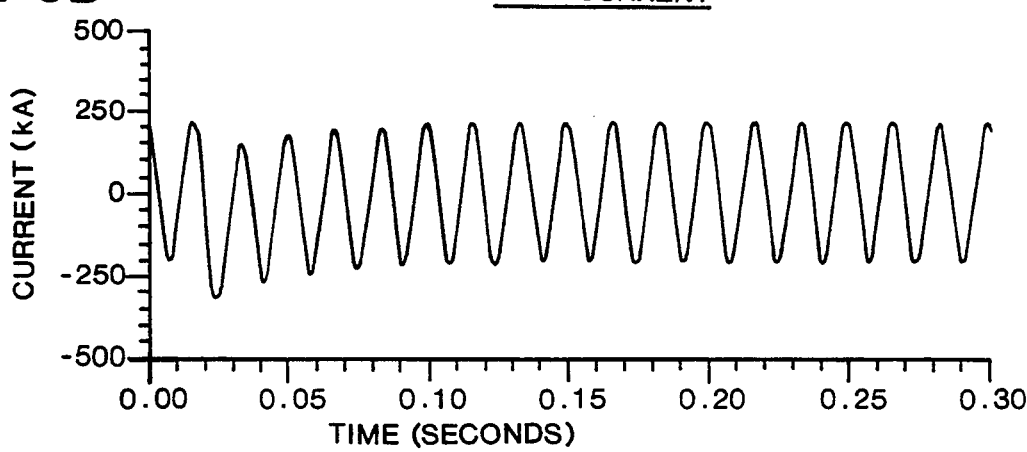
Figure 6C:
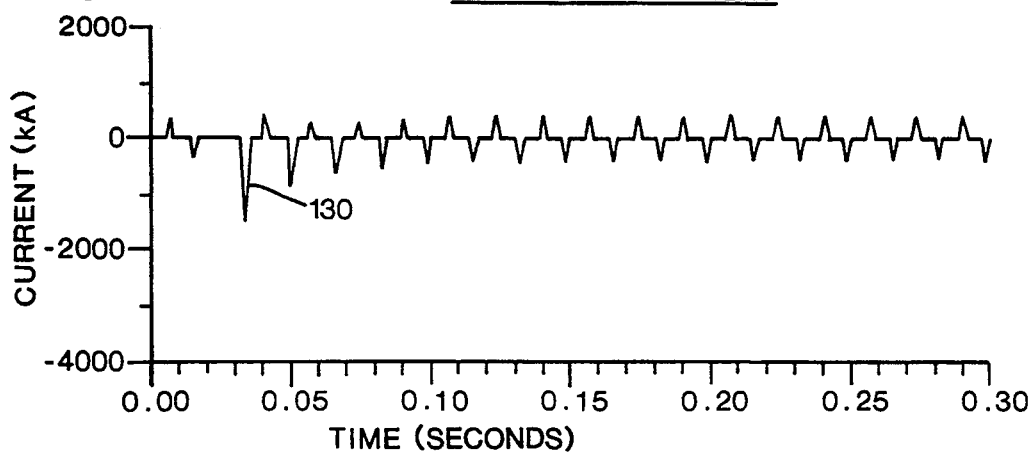

FIGS. 6A-6C illustrate the performance of the TCSC system 20 under subsynchronous resonance conditions when the inductance of the transmission line 24 and the selected capacitance of the series capacitor 30 resonate at 15 Hz. A small disturbance is introduced in the beginning of this simulation around time 0.02 seconds to cause a temporary deviation from steady-state operation. FIG. 6B shows the decay of the DC offset component in the line current $I_L$ back to the 60 Hz zero. The waveforms in FIGS. 6A-6C show recovery back to normal conditions in a smooth and rapid manner using the TCSC system 20.

Figure 7A:
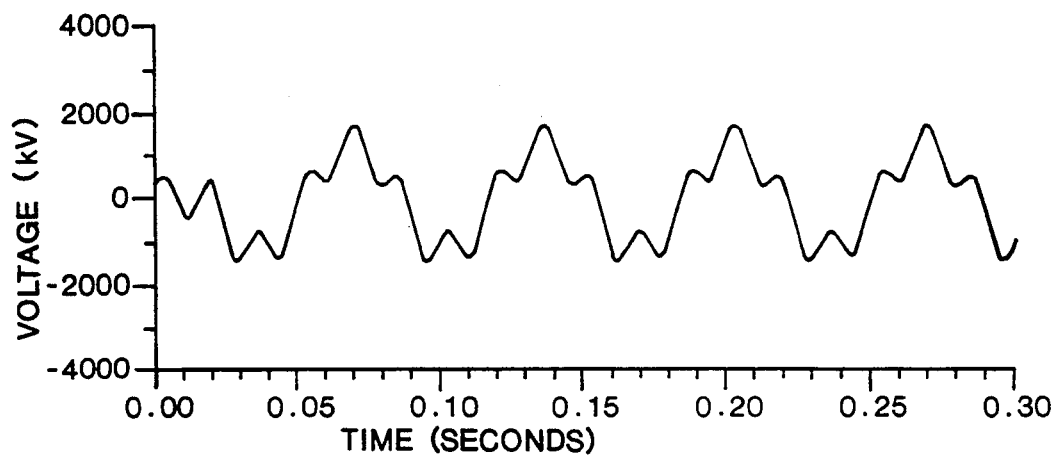
FIGS. 7A and 7B are graphs for a prior art system having no thyristor control, such as a conventional series capacitor application, with FIGS. 7A and 7B showing waveforms of the capacitor voltage, and the line current, respectively.
Figure 7B:
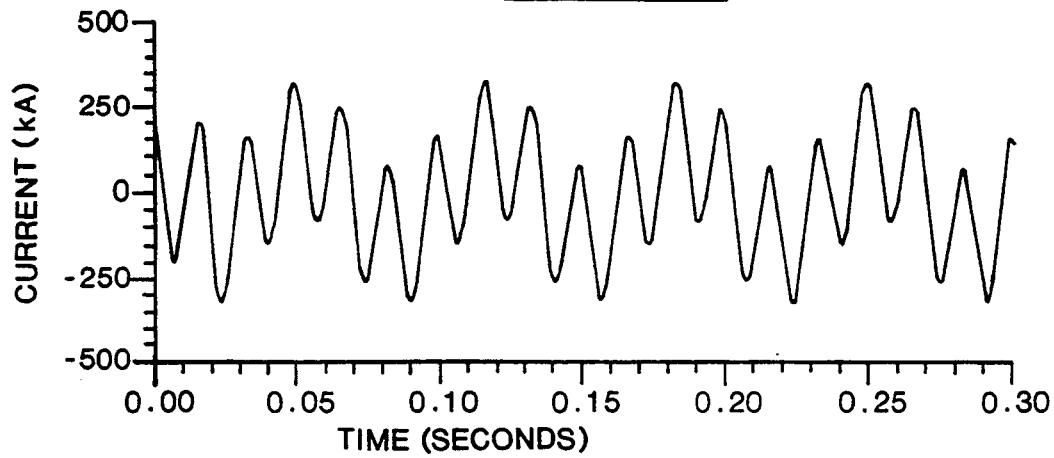

FIGS. 7A and 7B illustrate the response of a conventional series capacitor compensation system having no thyristor control. In contrast with the smooth recovery of the TCSC system 20 in FIGS. 6A-6C, FIGS. 7A and 7B illustrate the nature of response of this circuit if no thyristor control were provided at all. The capacitor voltage waveform of FIG. 7A, and the line current waveform of FIG. 7B, each display a clear 15 Hz component in the waveforms after the initiation of the disturbance. Furthermore, the waveforms of FIGS. 7A and 7B show only a very small damping of the disturbance.

FIGS. 8A–8C show the response of the Hingorani system when used in a network having a transformer line inductance and a series capacitance chosen to resonate at 15 Hz. FIGS. 8A–8C show the response of the Hingorani system when subjected to a small system disturbance on the same order as that applied to the TCSC system 20 for FIGS. 6A–6C. A comparison of FIG. 8A with FIG. 7A, and FIG. 8B with FIG. 7B, shows that the Hingorani system provides an improved response over a circuit lacking any type of thyristor control. However, a comparison of the capacitor voltage traces of FIG. 6A with FIG. 8A, as well as the line current waveforms of FIGS. 6B and 8B, clearly shows that the TCSC system 20 provides significantly faster damping of the transient activity. The firing time prediction method of the TCSC system 20 contributes to this quick response, as well as the choice of a more accurate reference time than that of the earlier systems.

Furthermore, by comparing the thyristor current of FIG. 8C with that of FIG. 6C, it is clear that the TCSC system 20 significantly reduces the duty seen on the thyristors 36. For example, a maximum negative pulse 128 of the Hingorani system (see FIG. 8C) has an amplitude over 3,000 kA. In contrast, a maximum negative thyristor current pulse 130 shown in FIG. 6C has an amplitude of approximately one half that experienced in the Hingorani system. Therefore, by decreasing the peak current through the thyristor valve 35, the duty on the thyristors is significantly reduced, and consequently, the lifetime of thyristors 36 is increased.

Figure 9A:
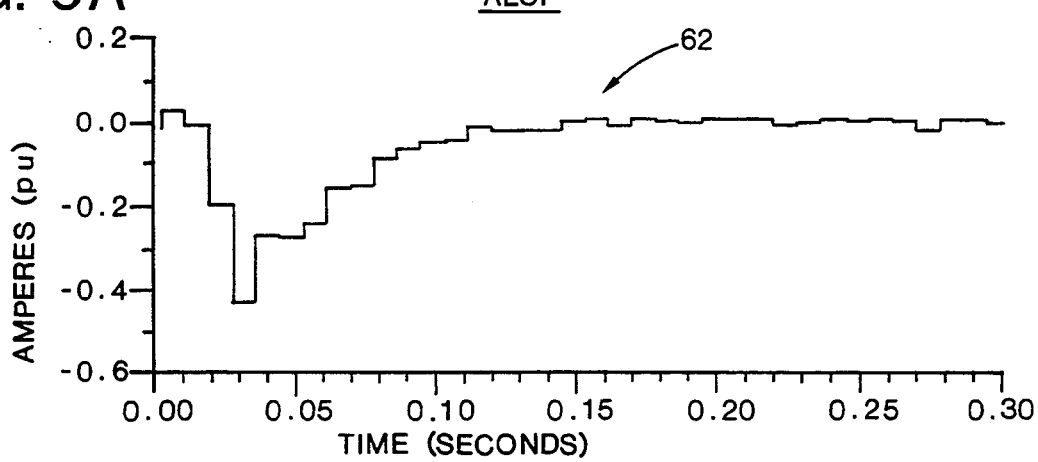
Figure 9B:
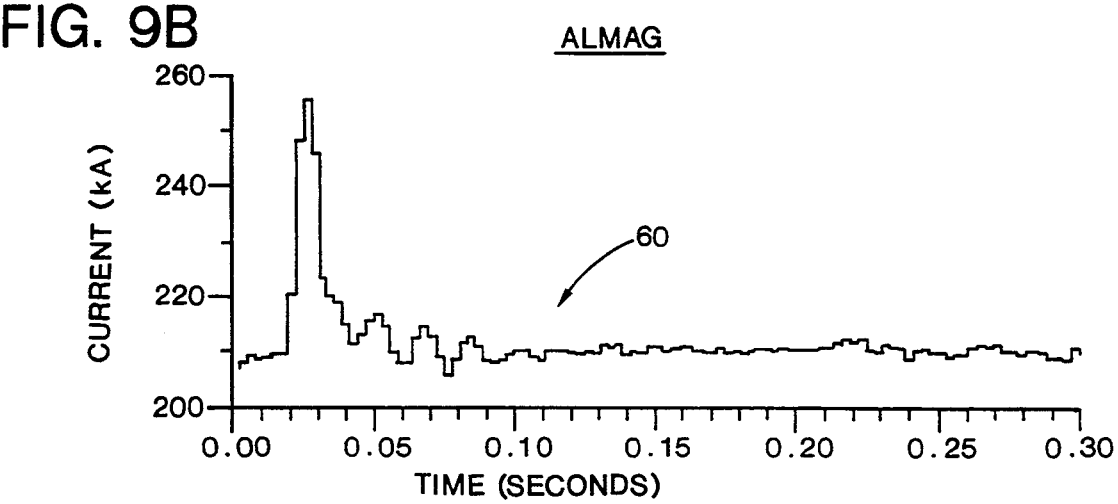
Figure 9C:
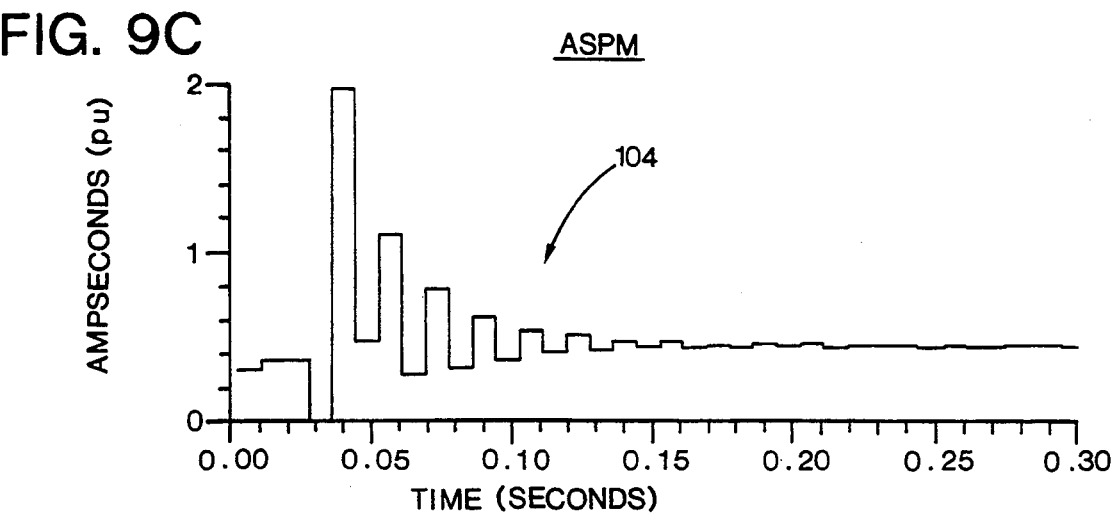
Figure 9D:
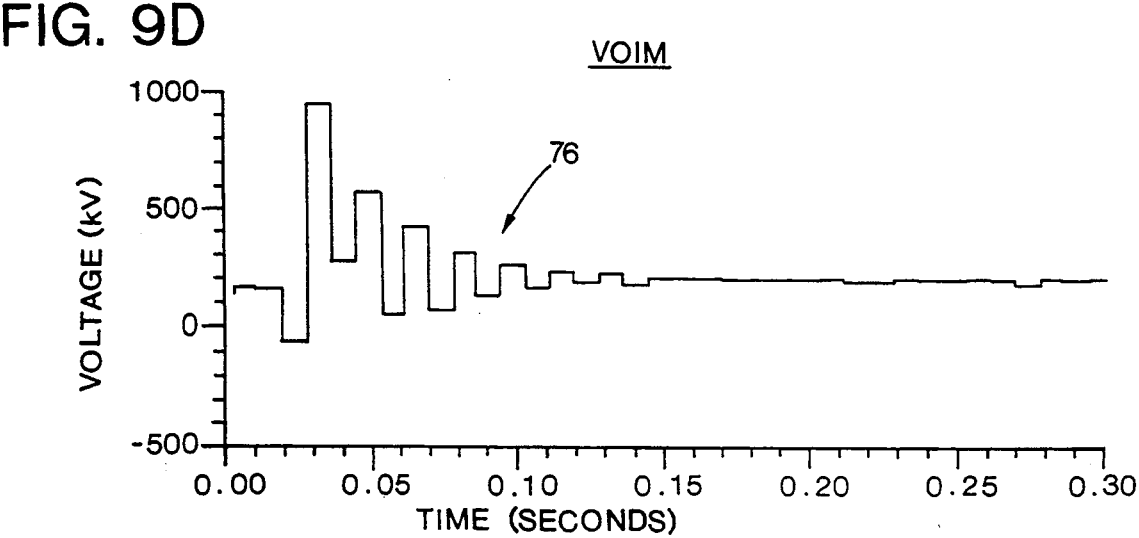
Figure 9E:
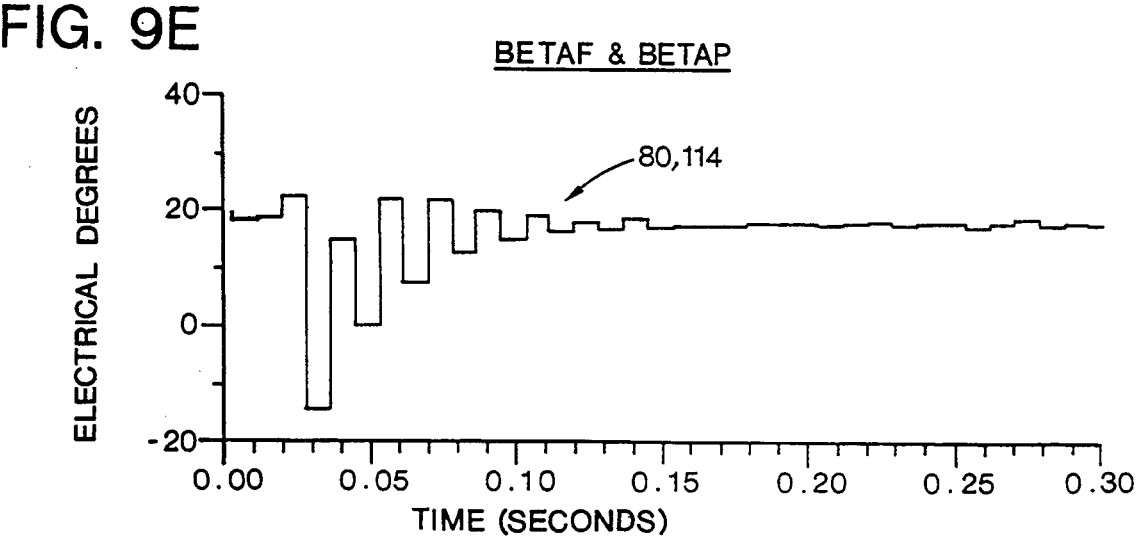

FIGS. 9A–9E show the traces of several of the internal control variables in controller 50 for the 15 Hz subsynchronous resonance frequency example and the small disturbance of FIGS. 6A–6C. FIG. 9A illustrates the measured line current offset component ALOP signal 62 provided by the XDCR 56. FIG. 9B shows the line current magnitude ALMAG signal 60, also produced by the XDCR 56. FIG. 9C shows the measured thyristor ampsecond ASPM signal 104, measured by the ASP monitor 102. FIG. 9D illustrates the output of the $V_C$ predictor 55 portion of the controller 50, that is, the VOIM signal 76 produced by comparator 74, which is indicative of the initial offset before the thyristor current pulse. FIG. 9E illustrates the waveforms of the predicted firing angle BETAP signal 80 and the final firing angle command BETAF signal 114 when the BETAC correction signal 110 is zero.

Figure 10A:
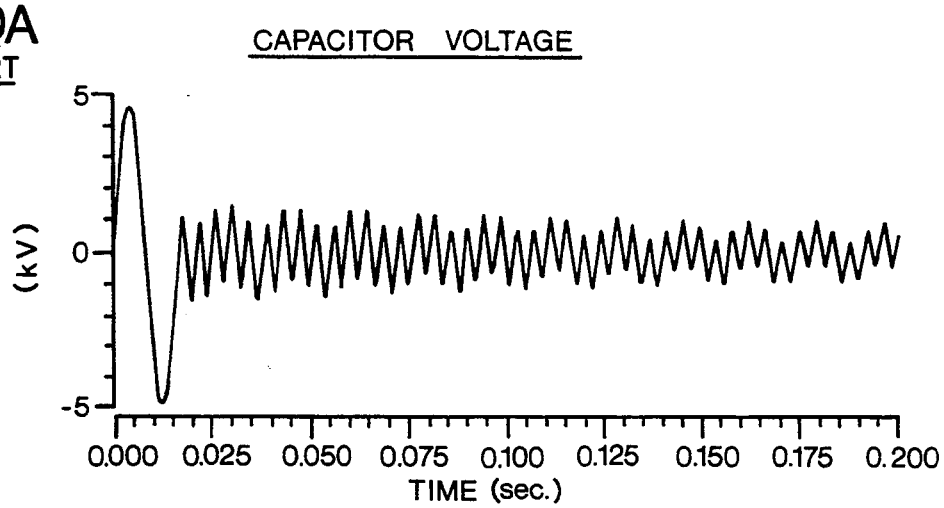
FIGS. 10A and 10B are graphs of a prior art system using a continuous gate signal to the thyristor valve, with FIG. 10A showing the capacitor voltage.
Figure 10B:
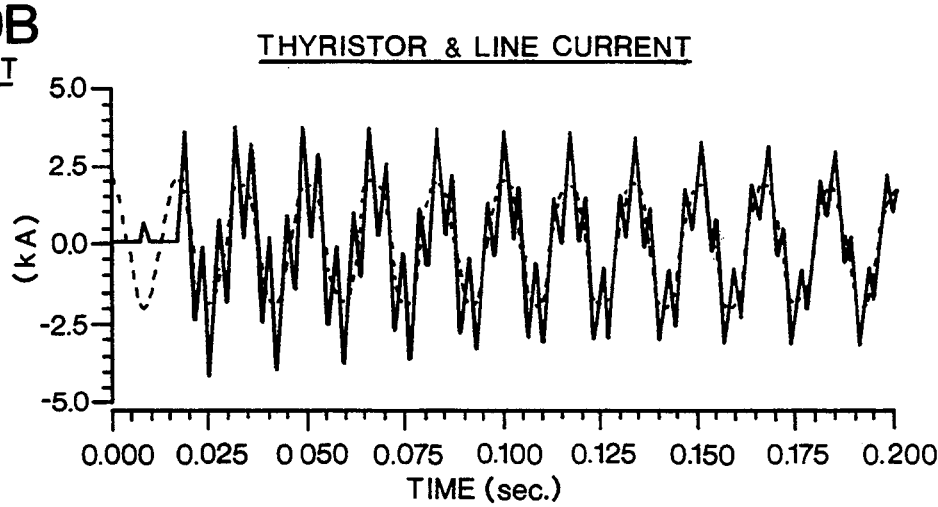
Figure 10C:
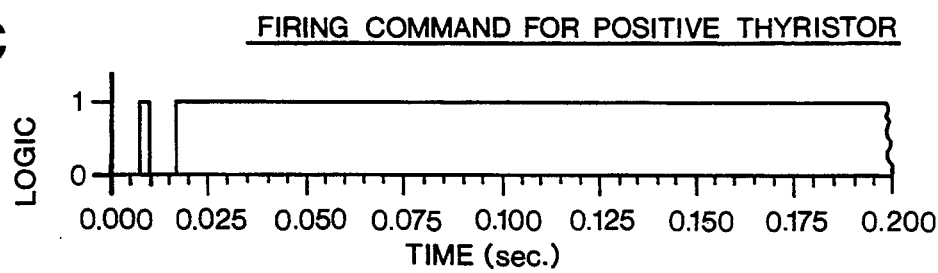
FIG. 10C showing the firing command logic for a positive thyristor (with respect to the line current)
Figure 10D:
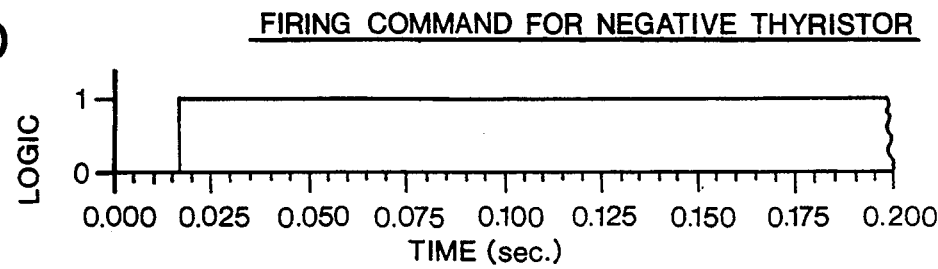
FIG. 10D showing the firing command logic for a negative thyristor (also with respect to the line current).

Bypass Mode Operation unfortunately, when the thyristor valve 35 fires into the bypass mode, the inductive nature of the commutating circuit 32 inherently establishes an oscillatory response in the main capacitor 30. In the past, others have suggested using a very simple control strategy to alleviate this problem. This earlier strategy applies a continuous gate signal to the thyristors and uses special resistive components (not shown) in the commutating circuit to damp the inherent oscillations. Using a resistive component with a continuous gate signal causes the commutating circuit to dampen the oscillations in a linear manner. An example of the oscillatory behavior of the output waveforms for the capacitor voltage, and the thyristor and line current are shown in FIGS. 10A and 10B, respectively. The continuous gate signals required by this earlier system to fire positive and negative bypass thyristors are illustrated in FIGS. 10C and 10D, respectively. The required resistive components add cost and operating losses to the system, which are major disadvantages of using this earlier continuous gate signal strategy.

The vernier controller 50 thus far described, may be constructed as shown in FIG. 2 to the use the capability of the thyristor valve 35 to create a nonlinear response. This nonlinear response may be controlled to damp the undesirable commutating circuit oscillations. Thus, there is no need to use special resistive components in the main power circuit equipment, as required by earlier systems.

Referring to FIG. 2, the vernier controller 50 includes a bypass mode valve firing angle generator 200. The firing angle generator 200 receives the measured capacitor voltage ($V_{CM}$) signal 42 from the voltage sensor 40 and the measured line current ($I_{LM}$) signal 46 from the line current sensor 44. The firing angle generator 200 generates a firing angle advance (BETABP) signal 202 and a pulse width ($\phi_{PW}$) signal 204 in a manner described further below. The switch 115 couples the firing time computer (FTC) 116 to receive the BETAF signal 114 for operation in the vernier mode. For operation in the bypass mode, switch 115 couples the FTC 116 to the BETABP signal 202 output of the firing angle generator 200. A second switch 205 couples the FTC 116 to the $\phi_{PW}$ signal 204 output of the firing angle generator 200 for operation in the bypass mode. The switch 205 disconnects the FTC 116 from the firing angle generator 200 for operation in the vernier mode. While switches 115 and 205 are illustrated as separate switches, it is apparent that they may be supplied as a single combination device.

Using the non-linear response characteristic of the thyristor valve, the oscillations are damped much faster than in the earlier systems using resistors. Instead of continuously firing both valves, as in the earlier systems, the vernier controller 50, using the PLL device 52 and the FTC 116, selects the correct valve, 36a or 36b, and the appropriate timing; whereas the firing angle generator 200 selects the firing angle (BETABP) signal 202 and the $\phi_{PW}$ pulse width signal 204 required to promptly damp the transients. The correct valve to fire depends upon the whether the line current is positive or negative.

Referring to FIG. 11 for instance, depending upon the polarity of the line current, the thyristor of the same polarity, fires to introduce the desired correction. To generate the positive thyristor current pulse 206, the firing signal generator 200 generates the firing command signal 48a, shown as pulse 207 in FIG. 11. The gate signal pulse 207 is initiated at a $BETABP_a$ advance angle determined from the predicted upcoming line current negative crest 208. The duration of the pulse 207 is shown as the pulse width $\phi_{PWa}$, which begins at the $BETABP_a$ angle. The current 206 through the thyristor 36a terminates before the end of the $\phi_{PW}$ duration of the gate pulse 207, when the current flowing through thyristor 36a reaches a current zero.

Similarly, the firing signal generator 200 generates the firing command signal 48b, shown as pulse 209 in FIG. 11, to generate the negative thyristor current pulse 210 through thyristor 36b. The gate signal pulse 209 is initiated at a $BETABP_b$ advance angle determined from the predicted upcoming line current positive crest 211. Full conduction is reached when the BETABP angle reaches 270°. The change in the firing angle magnitude from the steady-state bypass value of 270° is proportional to the magnitude of the disturbance, that is, the larger the oscillation magnitude, the larger the change in the firing angle magnitude, and visa versa. It is apparent that other firing conventions may be selected to implement the system described herein.

The duration of the pulse 209 is shown as the pulse width $\phi_{PWb}$, which begins at the BETABP$_b$ angle. The current 210 through the thyristor 36$b$ terminates before the end of the $\phi_{PW}$ duration of the gate pulse 209, when the current flowing through thyristor 36$b$ reaches a current zero. The duration represented by the pulse width $\phi_{PWa}$ and $\phi_{PWb}$ signals 204 is selected so only one thyristor 36$a$ or 36$b$ receives a gate signal for permission to conduct at any given time, which is clearly distinguished from the prior art system of FIGS. 10A–10D, where both thyristors are continuously fired. The magnitude of the pulse width $\phi_{PW}$ signal 204 depends upon the specific parameters of the circuit, which vary with each implementation, and it is apparent that the value of the $\phi_{PW}$ signal 204 may be optimized for each such implementation. The $\phi_{PW}$ duration of the gate signal is selected based upon the change in the firing angle, the capacitor voltage distortion, and/or the line current distortion.

Figure 12A:
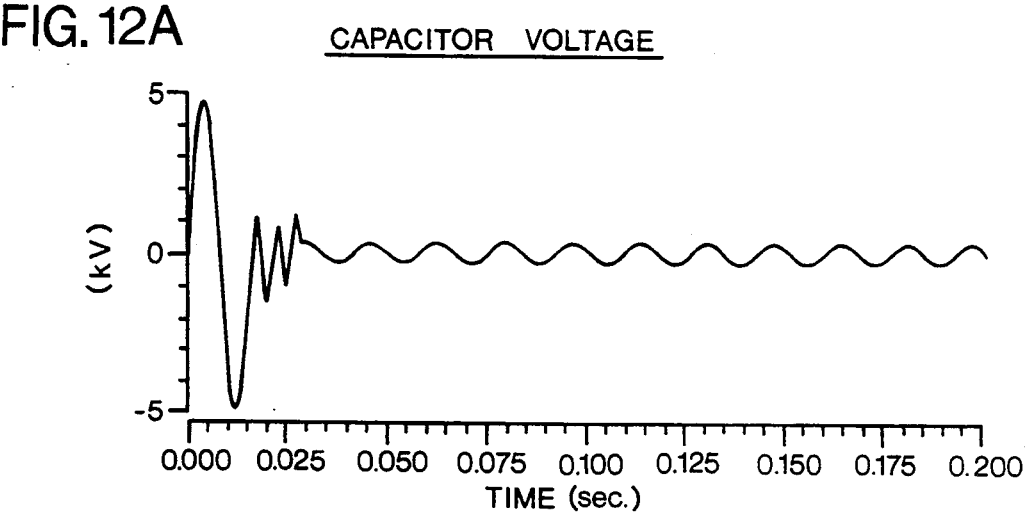
FIG. 12A–12D are graphs showing entry into the bypass mode using the system of FIGS. 1 and 2 for a commutating circuit having a resonant frequency near the fourth harmonic, with FIG. 12A showing the capacitor voltage.
Figure 12B:
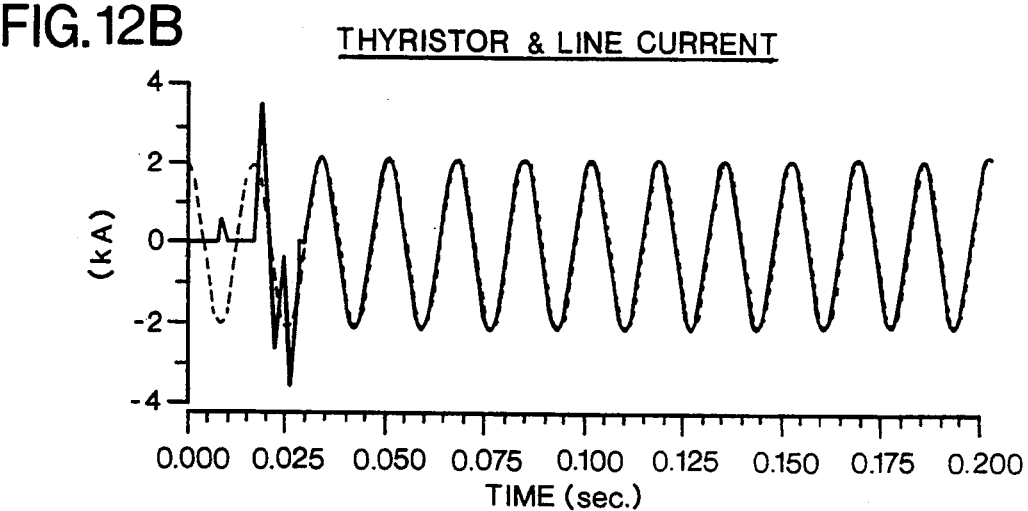
Figure 12C:
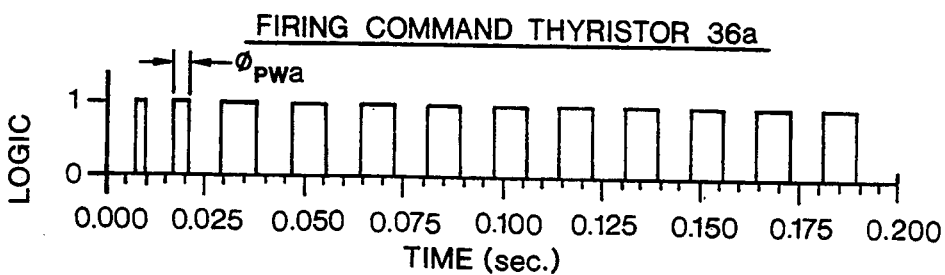
Figure 12D:
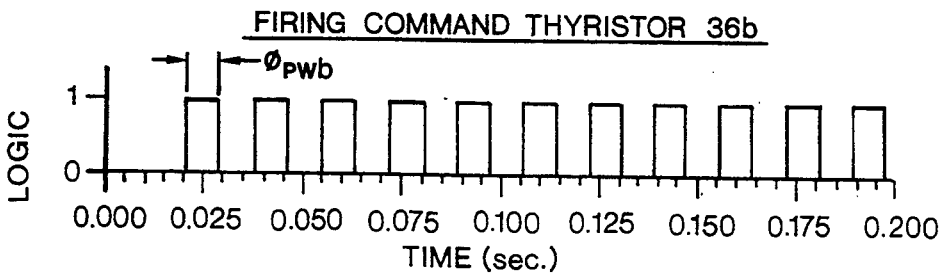

Use of this bypass control strategy is shown in FIGS. 12A and 12B. Initially the capacitor 30 is inserted with vernier control in series with the line 24. At a time around 0.017 seconds, the thyristor valve 35 begins firing to transition the TCSC system 20 into the bypass mode. The firing command signals 48$a$ and 48$b$ for the respective thyristors 36$a$ and 36$b$ are shown in FIGS. 12C and 12D, respectively. The width of the pulses in FIG. 12C are shown as $\phi_{PWa}$, and in FIG. 12D as $\phi_{PWb}$, and it is apparent that they may be independently varied in magnitude, or collectively varied by the bypass mode firing angle generator 200. A comparison of FIGS. 12A and 12B with FIGS. 10A and 10B illustrate the faster and smoother damping provided using the TCSC system 20 with the firing angle generator 200 providing a constant firing angle BETABP signal 202 of 270° and a constant pulse width $\phi_{PW}$ signal 204 of 180° to the firing time computer 116.

Note however, that the system variables used to generate the plots of FIGS. 12A–12B, and FIGS. 10A–10B, had a commutating circuit resonant frequency near the fourth harmonic (capacitive reactance of 2.31 ohms, and an inductive impedance of 0.15 ohms). If given a different implementation with a different resonant harmonic frequency, the response may not be as smooth as illustrated in FIGS. 12A and 12B.

Figure 13A:
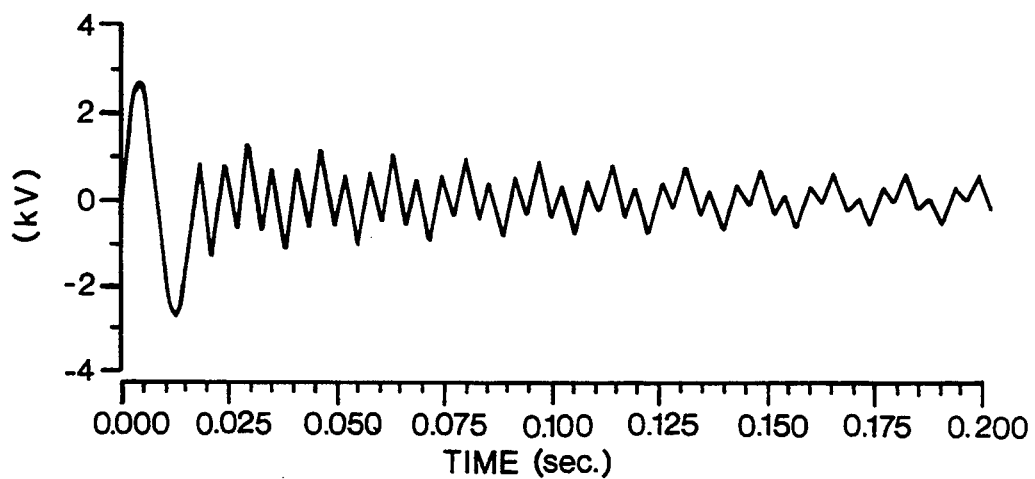
FIGS. 13A, 14A, 15A, 16A and 17A are graphs of the capacitor voltage.
Figure 13B:
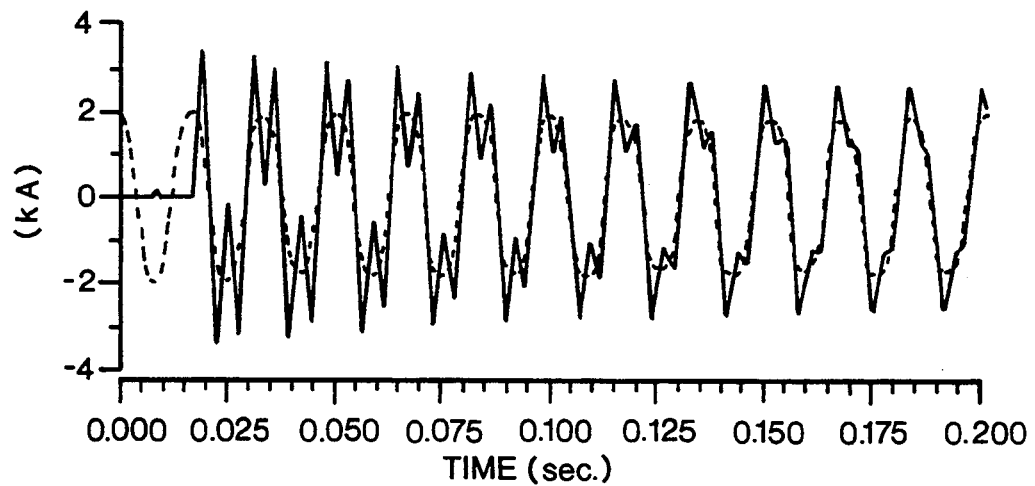
FIGS. 13B, 14B, 15B, 16B and 17B are graphs of the thyristor current, shown in solid lines, and the line current, shown in dashed lines, using the system of FIGS. 1 and 2 under the following conditions.

FIGS. 13A and 13B show the response of system with a commutating circuit having a resonant frequency at the third harmonic (capacitive reactance of 1.33 ohms, and an inductance of 392 microhenries). In this situation, using a constant firing angle adjustment yields a much smaller performance improvement than shown in FIGS. 12A and 12B. In terms of performance, a firing angle modification of the BETABP signal 202, other than the illustrated 270°, may be beneficial during transient conditions, but certainly unwanted during steady state conditions, since it would introduce nonlinear effects into the power line 24.

Figure 14A:
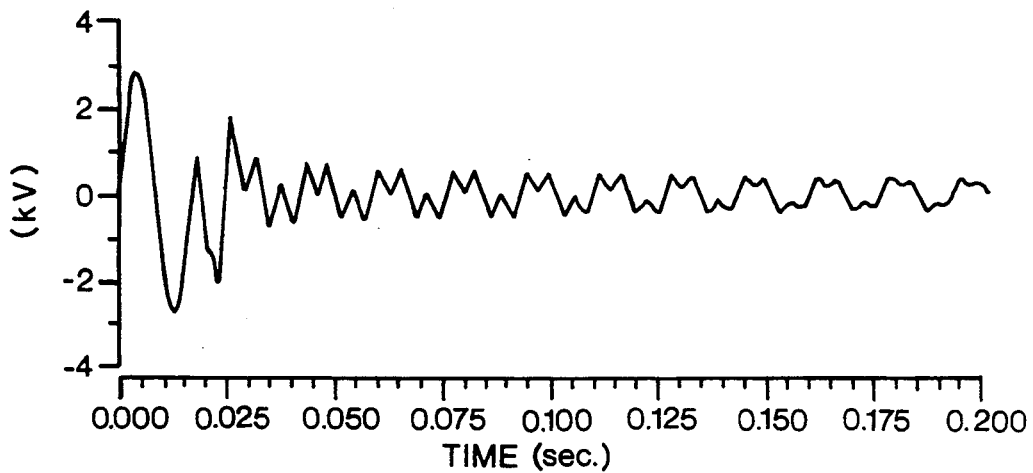
Figure 14B:
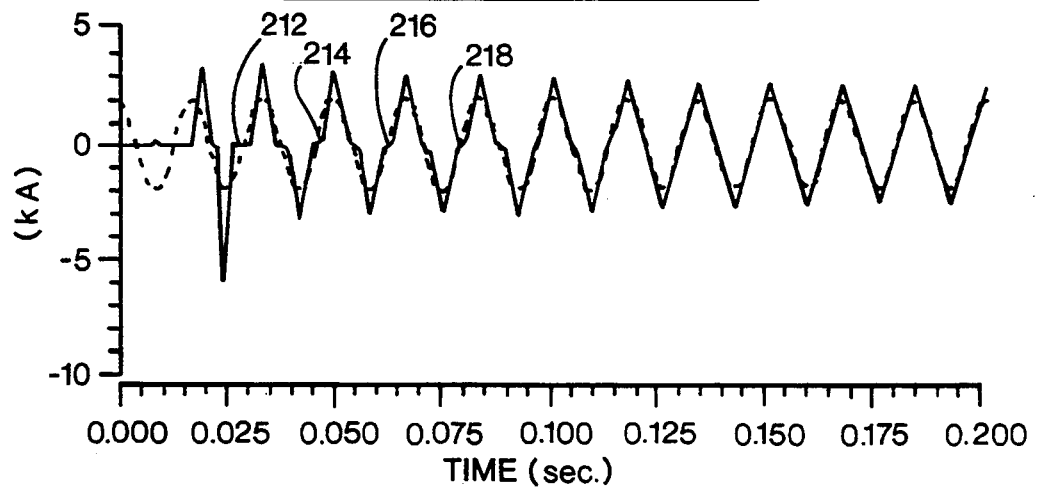

FIGS. 14A and 14B illustrate the response of a system having a commutating circuit with a third harmonic resonant frequency (capacitive reactance of 1.33 ohms, and an inductance of 392 microhenries). Here, the TCSC system 20 is subjected to firing angle modifications having gradually varying magnitudes over time. Basically, there is a direct relationship between the capacitor voltage distortion and the magnitude of the firing angle modification. Thus, initially the distortion is high, so a larger magnitude of the change in firing angle modification from the steady-state bypass value of 270° is employed by the BETABP signal 202. As the distortion drops, the magnitude of the firing angle modification also drops in a gradual fashion, as illustrated in FIGS. 14A and 14B. For example, in FIG. 14B the successive changing of the magnitudes of the firing angle are illustrated by the decreasing shoulders in the thyristor current graph at points 212, 214, 216 and 218, respectively. Here, the firing angle generator 200 varied the firing angle magnitude BETABP from 230° to 270°. As shown in FIGS. 14A and 14B, the magnitude of the change in firing angle has gone from 40° to 0°.

Referring to FIG. 11, for a varied firing angle case, for firing angles less than 270°, the pulse width $\phi_{PW}$ is also reduced from 180° by a corresponding amount to avoid simultaneous firing of the thyristors 36$a$ and 36$b$. In FIG. 11, the durations of the $\phi_{PWa}$ and $\phi_{PWb}$ pulse widths are illustrated as being equal. For bypass cases where the line currents have DC offsets, improved damping performance may be achieved by varying the firing angle BETABP signal 202 and the pulse width $\phi_{PW}$ signal 204 with the power frequency so the valve with the same polarity as the line current offset can conduct for a longer portion of the power cycle. Correspondingly, the opposite valve may conduct for the remaining portion of the power cycle. As used herein, the term "power cycle" refers to the period of the power system frequency, where the frequency is, for instance, 60 Hz in the United States.

Insertion Mode Control

Figure 15A:
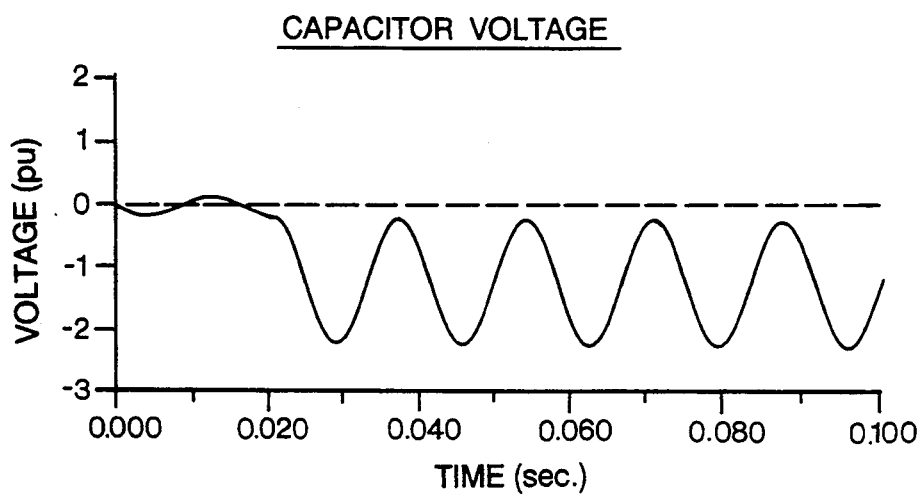
Figure 15B:
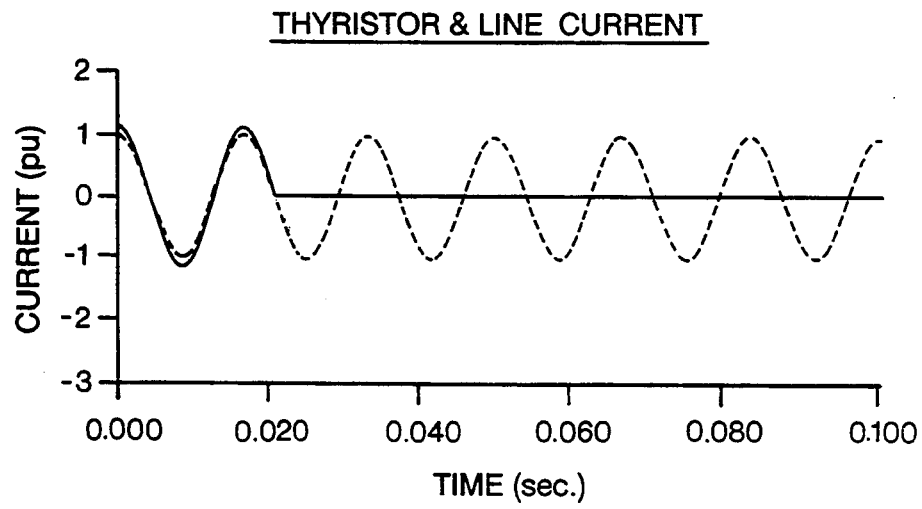

FIGS. 15A and 15B illustrate one manner of controlling insertion of the capacitor 30 electrically in series with the transmission line 24 while damping any transients induced by switching the thyristor valve 35 to a nonconducting state. Although the capacitor remains coupled to the line 24 at all times, the terms "insertion" or "electrically inserting" are used herein to refer to allowing the line current to flow through capacitor 30, rather than be diverted around the capacitor and through the bypass circuit 32.

While a current is flowing through line 24, electrically inserting capacitor 30 in series the line inherently produces a capacitor voltage, which is fully offset from zero. This DC offset arises from the inherent nature of the valve 35 which is only capable of entering a nonconducting state at a current zero. This offset voltage stimulates the natural oscillatory nature of the transmission line 24 and power system 22, which causes a number of serious adverse effects.

For example, introducing this DC offset excites the power system 22 and causes damaging subsynchronous oscillations, such as those illustrated in FIG. 7A. These subsynchronous oscillations can result in severe damage to turbine-generator units of the power system 22. In FIG. 15A, this DC offset is illustrated in a negative direction, although it is apparent that the offset may also be positive, depending upon which stage during the line current cycle the valve 35 is switched off.

Figure 16A:
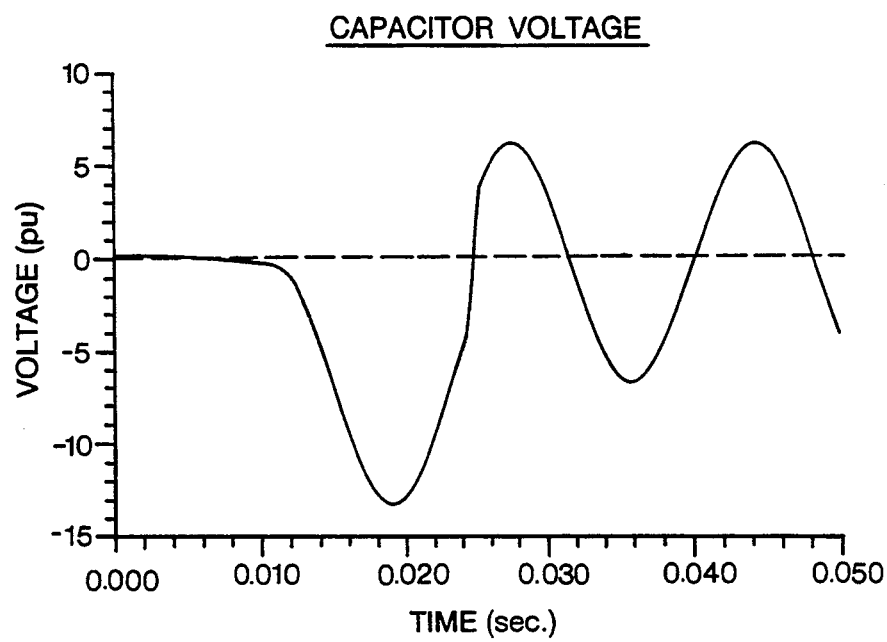
Figure 16B:
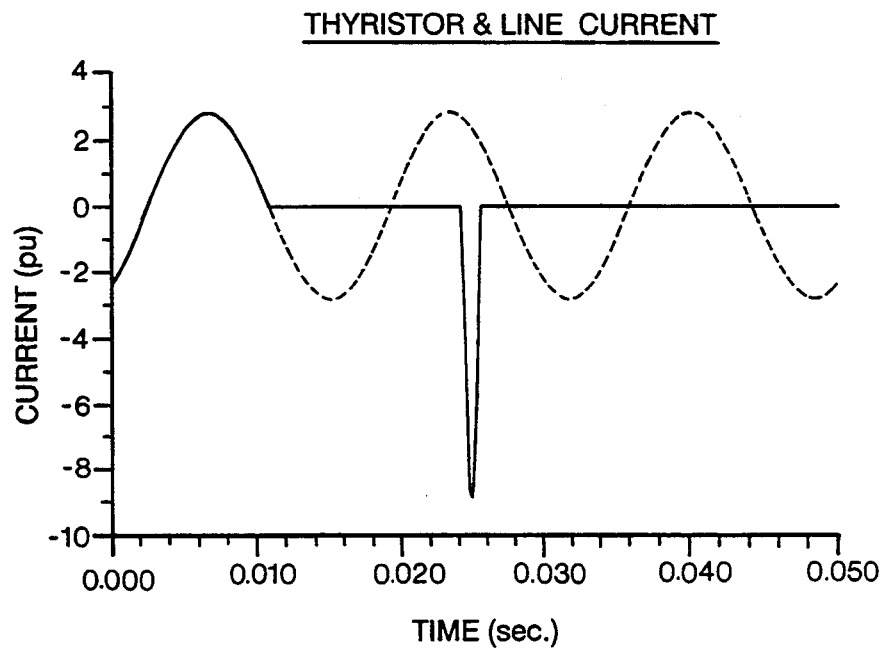

Referring to FIGS. 16A and 16B, around 0.010 seconds, the thyristor current passes through a zero crossing, and the thyristor valve 35 enters a nonconducting state. The resulting capacitor voltage is offset in a positive direction, as shown in FIG. 16A. Since the measured capacitor voltage exceeded the maximum magnitude established by the voltage offset $V_{OFF}$ comparator 74 of FIG. 2, at the next zero crossing of the capacitor voltage the firing time computer (FTC) 116 issued a firing command to the negative thyristor 36b. The duration of this pulse of commutating current was determined by the natural blocking of the thyristor 36b, which only conducts negative pulses. After this single bypass current pulse, the capacitor voltage regained a sinusoidal waveform as shown in FIG. 16A.

Figure 17A:
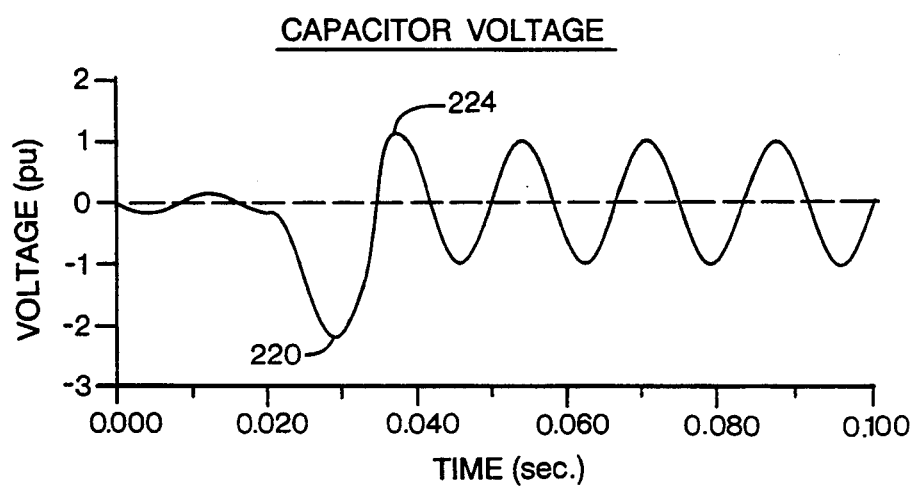
Figure 17B:
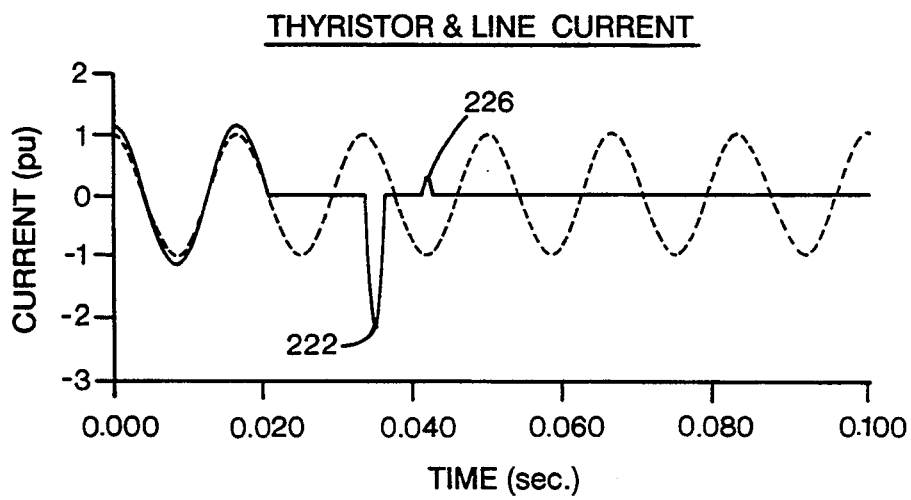

While FIGS. 16A and 16B show achievement of a sinusoidal capacitor voltage following a single commutating current pulse, it is apparent that for more severe disturbances, or delays in measuring the capacitor voltage $V_{CM}$, additional correction pulses may be required. For example, FIGS. 17A and 17B illustrate a system requiring two commutating circuit pulses to bring the TCSC system 200 back into a sinusoidal state. Initially, the TCSC system 20 is in the bypass mode, then at around 0.020 seconds, the capacitor 30 is inserted when the thyristor current passes through a zero crossing.

With the capacitor inserted, the TCSC system 20 operates in a normal vernier mode, and samples the crest of the capacitor voltage at each half cycle. Around 0.028 seconds, a negative peak capacitor voltage 220 is determined to be outside of the normal range. In response, the vernier controller 50 calculates the BETAF signal 114 which causes thyristor 36b to fire beginning around 0.033 seconds, generating a damping thyristor pulse 222. The current pulse 222 continues until the next thyristor current zero crossing. Sampling at the next half cycle, the vernier controller 50 finds that, at around 0.037 seconds, a positive capacitor voltage peak or crest 224 exceeds the normal range. This finding causes the controller 50 to generate the BETAF signal 114 which fires the positive thyristor 36a and generates pulse 226 shown in FIG. 17B. Preferably, the thyristor 36a is fired just before the next zero crossing of the capacitor voltage.

Beginning around 0.045 seconds, the capacitor voltage is seen to be completely sinusoidal, and DC offset is no longer present. Thus, as shown in FIG. 17B, from the initial insertion of the capacitor, the return to a sinusoidal state is quickly accomplished, in about 1.25 to 1.5 cycles total.

Conclusion

Having illustrated and described the principles of our invention with respect to a preferred embodiment, it should be apparent to those skilled in the art that our invention may be modified in arrangement and detail without departing from such principles. For example, other combinations of hardware and software may be used to implement the functions of the vernier controller 50 described herein. Furthermore, other types of monitors and signal processors may be used to provide the measured line current $I_{LM}$, the measured capacitor voltage $V_{CM}$, and the measured thyristor ampseconds ASPM to the vernier controller 50. Such structural equivalents for the monitors and the components of the vernier controller 50 are known to be interchangeable by those skilled in the art and may be substituted herein. We claim all such modifications falling with the scope and spirit of the following claims.

We claim:

1. A method of controlling a thyristor controlled series capacitor system having a capacitor in series with a substantially inductive transmission line, and a thyristor switched inductive commutating circuit in parallel with the capacitor, the method comprising the steps of:

monitoring a line current flowing through the transmission line;

predicting an upcoming firing time from the monitored line current;

switching the commutating circuit to conduct a thyristor current pulse therethrough at the predicted upcoming firing time; and in response to initiating and terminating the switching step, modifying the predicting step from occurring at steady-state values by a firing angle having a magnitude based upon the monitored line current.

2. A method according to claim 1 wherein:

the commutating circuit comprises a thyristor valve having a positive thyristor and a negative thyristor coupled together in antiparallel; and the switching step includes a bypass switching step comprising switching the positive and negative thyristors so only one of the thyristors has a gate signal applied at any time.

3. A method according to claim 1 further including the step of controlling the duration of the switching step.

4. A method according to claim 3 wherein:

the step of controlling the duration of the switching step comprises controlling the duration to extend by a selected pulse width from initiation at the firing angle; and wherein the firing angle comprises an advance angle determined with respect to a predicted upcoming peak value of the monitored line current.

5. A method according to claim 1 further including the steps of:

monitoring a capacitor voltage across the capacitor; and varying the magnitude of the firing angle in response to capacitor voltage distortion.

6. A method according to claim 5 further including the step of varying the magnitude of a gate pulse width in response to capacitor voltage distortion for controlling the switching step.

7. A method according to claim 1 further including the steps of:

maintaining a constant firing angle during transient conditions; and gradually adjusting the magnitude of the firing angle to steady-state values under steady state conditions.

8. A method according to claim 1 wherein the modifying step comprises the steps of:

selecting a normal vernier mode of operation in response to a higher-level controller signal for inserting the capacitor in series with the line; and selecting a bypass mode of operation in response to the higher-level controller signal for bypassing the capacitor.

9. A method according to claim 8 wherein:

the thyristor switched commutating circuit has two antiparallel thyristors, one for carrying positive line current, and the other for carrying negative line current; and the switching step for the bypass mode of operation comprises switching one of the two thyristors having the same polarity as the instantaneous positive or negative polarity of the line current.

10. A method according to claim 1 wherein:

the commutating circuit comprises a thyristor valve having a positive thyristor and a negative thyristor coupled together in antiparallel;

the switching step includes a bypass switching step comprising switching the positive and negative thyristors so only one of the thyristors has a gate signal applied at any time, with the conducting thyristor having the same polarity as the instantaneous positive or negative polarity of the line current;

the method further includes the step of controlling the duration of the switching step to extend by a selected pulse width from initiation at the firing angle;

the firing angle comprises an advance angle determined with respect to a predicted upcoming peak value of the monitored line current;

the method further includes the steps of monitoring a capacitor voltage across the capacitor, and varying the magnitude of the firing angle and the pulse width in response to capacitor voltage distortion;

the method further includes the steps of maintaining a constant firing angle during transient conditions, and gradually adjusting the magnitude of the firing angle to steady-state values under steady state conditions; and the modifying step comprises the steps of selecting a normal vernier mode of operation in response to a higher-level controller signal for inserting the capacitor in series with the line, and selecting a bypass mode of operation in response to the higher-level controller signal for bypassing the capacitor.

11. A vernier controller for controlling a thyristor controlled series capacitor system having a capacitor in series with a substantially inductive transmission line, a thyristor switched inductive commutating circuit in parallel with the capacitor, a voltage sensor for monitoring a voltage across the capacitor, and a current sensor for monitoring a current through the transmission line, the controller comprising:

a capacitor voltage predictor for predicting an initial capacitor offset voltage from the monitored line current and the monitored capacitor voltage;

a limiter for limiting the initial capacitor offset voltage and a capacitor offset voltage command received from a higher-level controller to provide a limited final capacitor offset voltage;

a storage device for determining a predicted firing angle from the limited final capacitor offset voltage and the predicted initial capacitor offset voltage;

a synchronizer for generating a first timing signal in response to the monitored line current;

a firing time computer for switching the commutating circuit to conduct a thyristor current pulse therethrough in response to the first timing signal and the predicted firing angle; and a bypass mode valve firing angle generator for selectively generating a firing angle and a pulse width to damp commutating circuit transients.

12. A vernier controller according to claim 11 wherein the bypass mode valve firing angle generator generates the firing angle adjustment in response to the monitored line current.

13. A vernier controller according to claim 11 wherein the bypass mode valve firing angle generator generates the pulse width in response to the monitored line current.

14. A vernier controller according to claim 11 wherein in response to a DC offset in the monitored capacitor voltage, following insertion of the capacitor in series with the line, by ceasing conduction of the commutating circuit, the firing time computer switches the commutating circuit to provide offset correcting pulses to damp the DC offset.

15. A method of controlling a thyristor controlled series capacitor system having a capacitor in series with a substantially inductive transmission line, and a thyristor switched inductive commutating circuit in parallel with the capacitor, the method comprising the steps of:

monitoring a line current flowing through the transmission line;

measuring a harmonic distortion on the capacitor voltage; and damping the harmonic distortion with a nonlinear response by switching the commutating circuit to conduct a thyristor current pulse therethrough in response to the monitored line current.

16. A method according to claim 15 wherein:

the commutating circuit comprises a thyristor valve having a positive thyristor and a negative thyristor coupled together in antiparallel; and the damping step includes a bypass switching step comprising switching the positive and negative thyristors so only one of the thyristors has a gate pulse at any time.

17. A method according to claim 15 further including the step of controlling the duration of the bypass switching step.

18. A method according to claim 15 wherein:

the damping step comprises switching the commutating circuit at a firing angle; and the method further includes the step of predicting an upcoming firing time in response to the firing angle and the monitored line current.

19. A method according to claim 17 further including the steps of:

maintaining a constant firing angle during transient conditions; and gradually adjusting the magnitude of the firing angle to steady-state values under steady state conditions.

20. A method according to claim 15 wherein:

the method further includes the step of operating in a normal vernier mode of operation in the absence of a harmonic distortion; and the damping step comprises selecting a bypass mode of operation in response to the harmonic distortion.

* * * * *